United States Patent [19]

Kawashima et al.

[11] Patent Number: 6,136,943
[45] Date of Patent: Oct. 24, 2000

[54] MULTI-BRANCHED COMPOUNDS AND CURABLE COMPOSITION

[75] Inventors: Miki Kawashima; Minoru Nakamura; Hiroaki Tanaka, all of Tokyo, Japan

[73] Assignee: Toyo Ink Mfg. Co., Ltd., Tokyo, Japan

[21] Appl. No.: 09/144,220

[22] Filed: Aug. 31, 1998

[30] Foreign Application Priority Data

| Sep. 1, 1997 | [JP] | Japan | 9-235743 |
| Sep. 8, 1997 | [JP] | Japan | 9-242261 |
| Oct. 27, 1997 | [JP] | Japan | 9-293697 |
| Oct. 27, 1997 | [JP] | Japan | 9-293698 |
| Nov. 25, 1997 | [JP] | Japan | 9-322527 |
| Feb. 2, 1998 | [JP] | Japan | 10-020749 |

[51] Int. Cl.$^7$ ................. C08G 83/00; C09D 201/00; C08L 101/00

[52] U.S. Cl. ............ 528/111; 528/113; 528/123; 525/329.3; 546/189; 546/196; 548/266; 548/268; 564/156; 564/160

[58] Field of Search ......... 525/329.3; 528/111, 528/113, 123; 564/156, 160; 548/266, 268; 546/189, 190

[56] References Cited

U.S. PATENT DOCUMENTS 5,300,584 4/1994 Farkas ................. 525/329.3

FOREIGN PATENT DOCUMENTS

| 2164175 | 6/1996 | Canada . |
| 0 234 408 | 9/1987 | European Pat. Off. . |
| 0 716 103 | 6/1996 | European Pat. Off. . |
| 0 735 076 | 10/1996 | European Pat. Off. . |
| WO93/14147 | 7/1993 | WIPO . |
| WO97/06201 | 2/1997 | WIPO . |

OTHER PUBLICATIONS

N. Moszner et al., *Macromol. Chem. Phys.*, 197(2), 621–631 (1996).

W. Shi et al., *J. Appl. Poly. Sci.*, 59(12), 1945–1950 (1996).

*Primary Examiner*—P. Hampton-Hightower
*Attorney, Agent, or Firm*—Wenderoth, Lind & Ponack, L.L.P.

[57] ABSTRACT

A multi-branched compound which can give a compound having a relatively high molecular weight but a low viscosity and having excellent coating performances, and can give a solvent-less composition having sufficient coating performances and having a low viscosity sufficient for forming a coating, and which can serve to decrease the amount of a low-molecular-weight compound having performance problems and the multi-branched compound is obtained by reacting a core compound obtained by subjecting (a) a polyamino compound having a molecule containing a primary or secondary amino group and (b-1) an active-hydrogen-containing (meth)acrylic compound in Michael addition reaction with (c) a vinyl-group-containing compound having a functional group reactive with the active hydrogen.

14 Claims, 3 Drawing Sheets

MULTI-BRANCHED COMPOUNDS AND CURABLE COMPOSITION

FIELD OF THE INVENTION

The present invention relates to a multi-branched compound and a curable composition containing the compound which can be used as a film-forming material such as a coating composition or an ink or as a resin for a sealant, a molding material, an adhesive or a tackiness agent and which can be also used as a curing agent or a reactive diluent for a heat- or radiation-curable composition. Further, it relates to a multi-branched compound and a curable composition which can be used as a heat- or radiation-curable resin for use as a vehicle for a printing ink or a coating composition, or as an adhesive.

PRIOR ART

Conventionally, resin solutions containing organic solvents are used as a coating composition, an adhesive, a tackiness agent, an ink, a filler and a molding material. The above resin solutions dissipate a large amount of the organic solvent in the steps of application, charging and curing/drying. With increasing concerns about global and working environments, limitations have come to be imposed on the use of the above resin solutions. For this reason, there have been developed resin materials such as a water-soluble resin, a powder, a hot melt, and the like. A water-based resin composition requires a large amount of heat for evaporating water which is a dispersing agent, and further, since it often contains an organic solvent to some extent for improving its coatability, a waste liquid disposal remains to solve. When used for coating or charged, a powder or a hot melt differ from conventional ones to a great extent in application and charging, and it is therefore newly required to introduce new equipment or facility. For overcoming the above problems, the resin solution has been converted to a high solid or the water-based resin has been improved. Due to these efforts, it is considered that the use amount of the resin solutions tends to decrease further clearly. As a fundamental solution, however, it is strongly desired to develop a solventless liquid resin composition which is free of problems on environmental pollution, safety, hygiene, ignition, explosion, etc., and which can be widely applied and can be easily applied or charged.

Typical examples that can be referred to as a solventless liquid resin composition are radiation-curable resin compositions. Conventional radiation-curable resin compositions contain low-viscosity monomers such as various acrylic monomers, reactive oligomers such as urethane acrylate, epoxy acrylate or ester acrylate and optionally other resin component. The low-viscosity monomer is used mainly as a reactive dilutent for controlling the viscosity of the composition. A composition containing a large amount of the low-viscosity monomer shrinks in volume when cured, and a cured film is fragile. Further, there is another problem that a residual monomer is odorous. It has been therefore desired to decrease the amount of the reactive diluent and increase the molecular weight thereof.

For improving a cured product in mechanical performance, it is preferred to incorporate a reactive oligomer, and it is further preferred to incorporate a resin material having a high molecular weight. Since, however, these materials have a high viscosity or is in a solid state, it is required to use a large amount of a reactive diluent in view of the fluidity of a composition before it is cured. The amount of the above materials is therefore limited. A cured product obtained by curing the conventional solventless liquid resin composition is therefore poor in cured product properties such as hardness, toughness, mechanical properties and chemical resistance, and it is much inferior to a cured product obtained from a solvent-containing or water-based resin composition. For improving the film performance, there has been developed a radiation-curable resin composition containing a large amount of a reactive oligomer and a resin material having a large molecular weight. However, it contains a large amount of a reactive diluent having a low molecular weight or an organic solvent for decreasing its viscosity to an applicable level, and under the circumstances, it cannot be said that it is improved in view of environments.

SUMMARY OF THE INVENTION

It is an object of the present invention to provide a multi-branched compound which can give a liquid compound having a relatively high molecular weight but a low viscosity and having excellent coating performances.

It is an object of the present invention to provide a multi-branched compound which can give a solvent-less resin composition having sufficient coating performances and having a low viscosity sufficient for coating.

It is another object of the present invention to provide a multi-branched compound which can serve to decrease the amount of a low-molecular-weight compound having performance problems.

It is further another object of the present invention to provide a curable composition containing a multi-branched compound which can form a coating by a conventional coating method using a roll coater or knife coater or by a conventional printing method such as an offset printing method, a gravure printing method, a letterpress printing method or a screen printing method.

It is still further another object of the present invention to provide a multi-branched compound and a curable composition which can be cured by any one of conventional triggers such as heating, ultraviolet light, infrared light, electron beam and γ ray.

It is yet further another object of the present invention to provide a multi-branched compound which is curable in the absence of a catalyst or a polymerization initiator when cured under irradiation with electron beam, γ ray, and the like.

It is further another object of the present invention to provide a printing ink, a coating composition or a curable resin composition containing the above multi-branched compound.

According to the present invention, there is provided a multi-branched compound which is obtained by reacting a core compound obtained by subjecting (a) a polyamino compound having at least one primary or secondary amino group and (b-1) an active-hydrogen-containing (meth) acrylic compound in a Michael addition reaction with (c) a vinyl-group-containing compound having a functional group reactive with the active hydrogen.

Further, according to the present invention, there is provided a multi-branched compound which is included in the above multi-branched compound and which is obtained by reacting active hydrogen of the core compound with the vinyl-group-containing compound (c) having a functional group reactive with active hydrogen, the amount of the functional group being stoichiometrically equivalent to the amount of the active hydrogen.

Further, according to the present invention, there is provided a multi-branched compound which is included in the above multi-branched compound and which is obtained by reacting active hydrogen of the core compound with the vinyl-group-containing compound (c) having a functional group reactive with active hydrogen, part of the active hydrogen atoms remaining unreacted.

Further, according to the present invention, there is provided a multi-branched compound which is included in the above multi-branched compound and which is obtained by reacting the vinyl-group-containing compound (c) having a functional group reactive with active hydrogen to at least one of all the active hydrogen atoms of the core compound and reacting the vinyl-group-containing compound (c) having a functional group reactive with active hydrogen to 95% or less of all the active hydrogen atoms of the core compound.

Further, according to the present invention, there is provided a multi-branched compound which is included in the above multi-branched compound and wherein the polyamino compound (a) is a diamino compound of the following formula (1), $$H_2N-CH_2-R-CH_2-NH_2 \qquad (1)$$

wherein R is a direct bond, $-C_nH_{2n}-$ in which n is an integer of 1 to 20, a phenylene group or a cycloalkylene group.

Further, according to the present invention, there is provided a multi-branched compound which is included in the above multi-branched compound and wherein the polyamino compound (a) has a number average molecular weight of 30 to 5,000.

Further, according to the present invention, there is provided a multi-branched compound which is included in the above multi-branched compound and wherein the vinyl-group-containing compound (c) having a functional group reactive with active hydrogen is a vinyl-group-containing compound containing an isocyanate group.

Further, according to the present invention, there is provided a multi-branched compound which is included in the above multi-branched compound and wherein the active-hydrogen-containing (meth)acrylic compound (b-1) is at least one member selected from compounds of the following formulae (2) to (5), $$CH_2=C(R^1)COO-R^2-OH \qquad (2)$$

wherein $R^1$ is a hydrogen atom or $-CH_3$ and $R^2$ is an alkylene group having 2 to 22 carbon atoms, $$CH_2=C(R^1)COO(C_xH_{2x}O)_mH \qquad (3)$$

wherein $R^1$ is a hydrogen atom or $-CH_3$, x is an integer of 1 to 6 and m is an integer of 1 to 25,

  (4)

wherein $R^1$ is a hydrogen atom or $-CH_3$, y is an integer of 2 to 22, z is an integer of 2 to 15 and k is an integer of 1 to 20, $$CH_2=C(R^1)COR^3O(CONHR^4NHOR^5O)_nH \qquad (5)$$

wherein $R^1$ is a hydrogen atom or $-CH_3$, $R^3$ is an alkylene group having 2 to 22 carbon atoms, $R^4$ is an isocyanate residue of any one of the following formulae (6-a) to (6-h), $R^5$ is a dihydric alcohol residue of $-(C_rH_{2r}O)_q-$ in which r is an integer of 1 to 4 and q is an integer of 1 to 20 or $-C_pH_{2p}-$ in which p is an integer of 1 to 20 and h is an integer of 1 to 10.

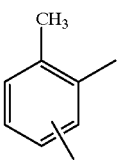 (6-a)

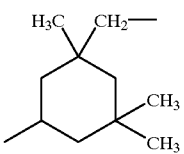 (6-b)

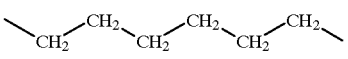 (6-c)

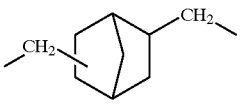 (6-d)

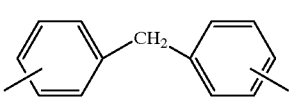 (6-e)

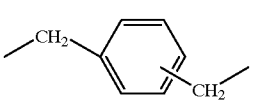 (6-f)

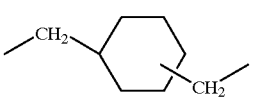 (6-g)

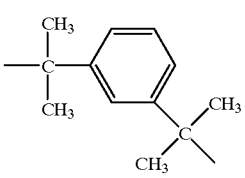 (6-h)

Further, according to the present invention, there is provided a multi-branched compound which is included in the above multi-branched compound and wherein the core compound is obtained by reacting the polyamino compound (a) with the active-hydrogen-containing (meth)acrylic compound (b-1) and a non-functional (meth)acrylic compound (b-2) of the following formula (8) in Michael addition reaction, $$CH_2=C(R^1)COO-R^6 \qquad (8)$$

wherein $R^1$ is a hydrogen atom or methyl and $R^6$ is $-C_vH_{2v+1}$, $-(C_xH_{2x}O)_mR^7$ or $-C_yH_{2y}O(COC_zH_{2z}O)_kR^7$ in which $R^7$ is a phenyl group or an alkyl group having 1 to 22 carbon atoms, v is an integer of 1 to 25, x is an integer of 1 to 6, y is an integer of 2 to 22, z is an integer of 2 to 15, m is an integer of 1 to 25 and k is an integer of 1 to 20.

Further, according to the present invention, there is provided a multi-branched compound which is included in the above multi-branched compound and wherein the molar ratio of the active-hydrogen-containing (meth)acrylic compound (b-1) and the non-functional (meth)acrylic compound (b-2), (b-1):(b-2), is 1:999 to 99:1.

Further, according to the present invention, there is provided a multi-branched compound which is included in the above multi-branched compound and has the formula (9),

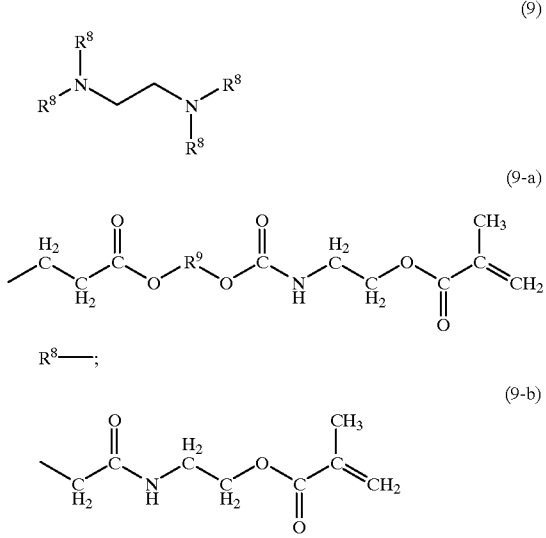

Wherein $R^8$ is an organic residue shown by formula (9-a) or (9-b), $R^9$ is an alkylene group having 2 to 22 carbon atoms or polyalkyleneglycol residue shown by —$(C_sH_{2s}O)_t$— in which s is an integar of 2 to 4, t is an integar of 1 to 25.

Further, according to the present invention, there is provided a multi-branched compound which is included in the above multi-branched compound and which is in a liquid state and has a number average molecular weight of 200 to 10,000 and a viscosity, measured at 30° C., of 100,000 cps or lower.

Further, according to the present invention, there is provided a multi-branched compound which is included in the above multi-branched compound and which is radiation-curable.

Further, according to the present invention, there is provided a curable composition containing 5 to 99% by weight of the above multi-branched compound (A) and 1 to 95% by weight of a polymerizable-unsaturated-group-containing compound (B) other than the above.

Further, according to the present invention, there is provided a curable composition which is included in the above curable composition and where the polymerizable-unsaturated-group-containing compound (B) has a viscosity, measured at 30° C., of 10,000 cps or lower.

Further, according to the present invention, there is provided a curable composition which is included in the above curable composition and which is radiation-curable.

Further, according to the present invention, there is provided a printing ink containing the above curable composition.

Further, according to the present invention, there is provided a coating composition containing the above curable composition.

Further, according to the present invention, there is provided a cured product obtained by curing the above curable composition.

DETAILED DESCRIPTION OF THE INVENTION

Figure 1:
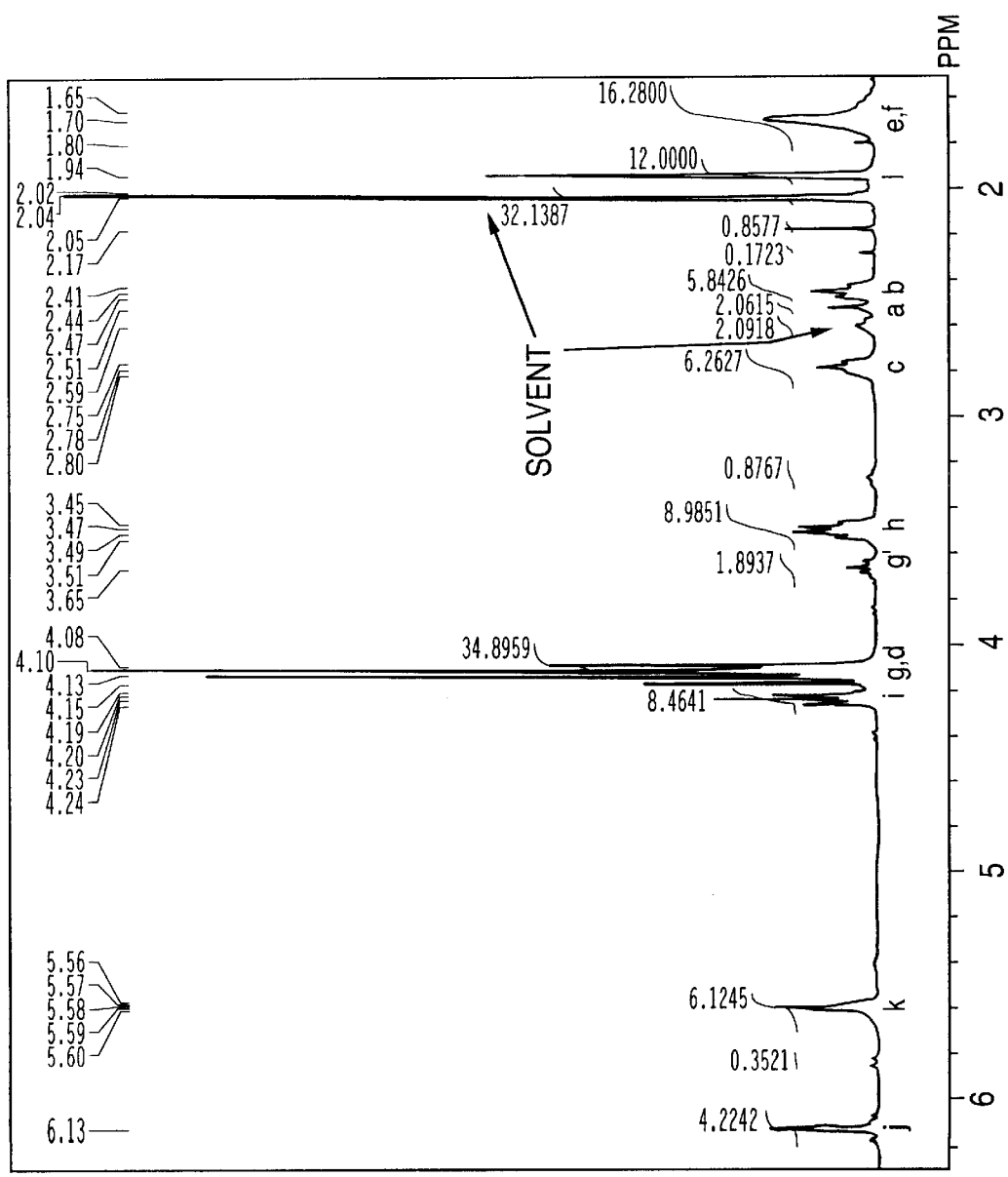
FIG. 1 shows $^1$H-NMR chart of a multi-branched compound obtained in Example 1.

For overcoming the above problems, the present inventors have made diligent studies on a correlation between the structure and the viscosity with regard to various resins, and as a result, the following has been found. By changing the molecular structure of a polymer from a general linear polymer to a comb-shaped polymer and further to a multi-branched polymer, the viscosity of the polymer decreases in spite of having a high molecular weight, and that the number of functional groups such as vinyl groups that can be introduced into terminals increases. Further, when a multi-branched compound has active-hydrogen-containing functional groups in terminals, the multi-branched compound shows excellent adhesion to a substrate, particularly to a plastic material, to which the adhesion of a conventional radiation-curable system has been so far said to be difficult. Moreover, when a flexible long-chain group having a proper chain length is introduced, both an increase in a molecular weight and a proper viscosity before curing can be attained in a state where curability is maintained, and a cured product is improved in mechanical properties and adhesion to a substrate.

Furthermore, there has been found a multi-branched compound, or a novel liquid resin, which has a high molecular weight but has a viscosity in a range compatible with the formation of a film or a coating by a conventional film-forming method and which can be cured at a high rate by using, as a trigger, a conventional curing method, electron beam in particular.

The polyamino compound (a) used in the present invention is a compound which is used as a starting material for converting a compound to a compound having a multi-branched structure and which has a molecule containing a total of at least 3 active hydrogen atoms derived from primary or secondary amino group. The polyamino compound (a) includes a linear or branched aliphatic polyamino compound, an alicyclic polyamino compound, an aliphatic aromatic polyamino compound and an aliphatic aromatic polyamino polyol compound.

The linear or branched aliphatic amine used in the present invention includes hydrazine compounds such as hydrazine and adipic acid hydrazide and diamino compounds of the formula (1) such as ethylenediamine, propanediamine, butanediamine, pentanediamine, hexanediamine, diaminooctane, diaminodecane and diaminododecane, and further, it also includes 2,5-dimethyl-2,5-hexamethylenediamine, polyoxypropylenediamine, diethylenetriamine and tetraethylenepentamine.

The alicyclic polyamino compound includes menthenediamine, isophoronediamine, bis(4-amino-3-methyldicyclohexyl)methane, diaminodicyclohexylmethane, 3,9-bis(3-aminopropyl)-2,4,8,10-tetraoxaspiro(5,5)undecane, 1,4-bis(2-amino-2-methylpropyl)piperazine, bis(aminomethyl)-bicyclo[2,2,1]heptane, methylenebis(furanmethaneamine).

The aliphatic aromatic polyamino compound includes m-xylenediamine and p-xylenedimaine.

The aliphatic aromatic polyamino polyol compound includes an ethylene oxide adduct of m-xylenediamine, a propylene oxide adduct of m-xylenediamine, an ethylene oxide adduct of p-xylenediamine and a propylene oxide adduct of p-xylenediamine.

Of the above compounds, a diamino compound of the following formula (1) is preferred, since the core compound can be variously changed in form and since mechanical properties of a cured product are improved.

  (1)

wherein R is a direct bond, —$C_nH_{2n}$— in which n is an integer of 1 to 20, preferably 1 to 12, a phenylene group or a cycloalkylene group.

Since the polyamino compound (a) is a starting material for the core compound, it is effective for decreasing the viscosity of the multi-branched compound and increasing functional groups in number that the polyamino compound (a) contains amino groups highly densely per molecule. For achieving the above object, preferred are diamino compounds having a low molecular weight such as ethylenediamine, tetramethylamine and xylenediamine or compounds having at least three primary or secondary amino groups such as diethylenetriamine.

Although not specially limited, the number average molecular weight of the polyamino compound (a) is 30 to 5,000, preferably 50 to 500. A polyamino compound having a number average molecular weight of more than 500, particularly 5,000 or more, is sometimes not desirable in view of handling since it causes the viscosity to increase or is a solid.

When the polyamino compound (a) contains a primary amino group, two active hydrogen atoms derived from the amino group and the active-hydrogen-containing (meth)acrylic compound (b-1) undergo a Michael addition, whereby the core compound can be converted to a multi-branched compound. Further, active hydrogen derived from the active-hydrogen-containing (meth)acrylic compound (b-1) introduced into terminals or unreacted active hydrogen derived from the amino group of the polyamino compound (a) functions as a reactive site where active hydrogen and the vinyl-group-containing compound (c) having a functional group reactive with active hydrogen undergo a reaction.

The active-hydrogen-containing (meth)acrylic compound (b-1) in the present invention has a molecule containing active hydrogen derived from hydroxyl group, carboxyl group, etc.

The (meth)acrylic compound having a molecule containing at least one hydroxyl group includes a hydroxyalkyl (meth)acrylate compound of the formula (2), $CH_2=C(R^1)COO-R^2-OH$  (2)

wherein $R^1$ is a hydrogen atom or —$CH_3$ and $R^2$ is an alkylene group having 2 to 22 carbon atoms, preferably 2 to 16 carbon atoms,
a polyalkylene glycol mono(meth)acrylate compound of the formula (3), $CH_2=C(R^1)COO(C_xH_{2x}O)_mH$  (3)

wherein $R^1$ is a hydrogen atom or —$CH_3$, x is an integer of 1 to 6, preferably 2 to 4, and m is an integer of 1 to 25, preferably 4 to 16,
a polylactone mono(meth)acrylate compound of the formula (4), $CH_2=C(R^1)COOC_yH_{2y}O(COC_zH_{2z}O)_kH$  (4)

wherein $R^1$ is a hydrogen atom or —$CH_3$, y is an integer of 2 to 22, preferably 2 to 16, z is an integer of 2 to 15, preferably 3 to 5, and k is an integer of 1 to 20, preferably 1 to 5,
and a urethane mono(meth)acrylate compound of the formula (5), $CH_2=C(R^1)COR^3O(CONHR^4NHOR^5O)_hH$  (5)

wherein $R^1$ is a hydrogen atom or —$CH_3$, $R^3$ is an alkylene group having 2 to 22 carbon atoms, preferably 2 to 16 carbon atoms, $R^4$ is an isocyanate residue of any one of the following formulae (6-a) to (6-h), $R^5$ is a dihydric alcohol residue of —$(C_rH_{2r}O)_q$— in which r is an integer of 1 to 4 and q is an integer of 1 to 100, preferably 1 to 20, or —$C_pH_{2p}$— in which p is an integer of 1 to 20 and h is an integer of 1 to 10.

  (6-a)

  (6-b)

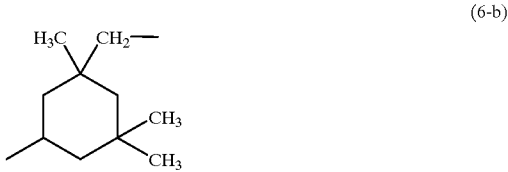  (6-c)

  (6-d)

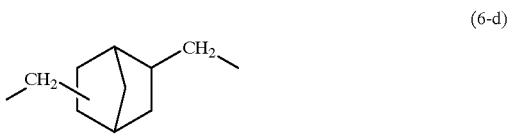  (6-e)

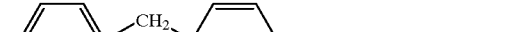  (6-f)

  (6-g)

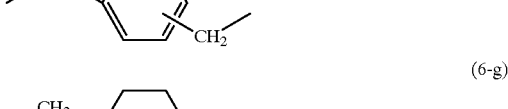  (6-h)

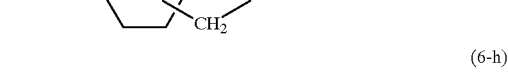

In the present invention, as far as the chain length of the active-hydrogen-containing (meth)acrylic compound (b-1) is concerned, it is preferred to use an active-hydrogen-containing (meth)acrylic compound having a small chain length when a hard cured product is required, and it is preferred to use an active-hydrogen-containing (meth)acrylic compound having a large chain length for improved flexibility. So long as the active-hydrogen-containing (meth)

acrylic compound (b-1) is selected from the above compounds, the molecular weight of the multi-branched compound increases with an increase in chain length, while the multi-branched compound tends to show a decrease in viscosity. When the active-hydrogen-containing (meth) acrylic compound has a larger chain length than those of the above compounds, undesirably, the multi-branched compound has a high viscosity, or it is a solid at room temperature, and further, it is poor in curing properties in some cases.

Specific examples of the hydroxyalkyl (meth)acrylate compound of the formula (2) include 2-hydroxyethyl (meth) acrylate, 2-hydroxypropyl (meth)acrylate, 4-hydroxybutyl (meth)acrylate and 2-hydroxybutyl (meth)acrylate. The acryl compound is prefer to methacryl compound as a compound (b-1). The preferable $R^1$ in the formulae (1) to (5) is hydrogen, since the Michael addition reaction can be carried out under more mild contidions.

Specific examples of the alkylene glycol mono(meth) acrylate compound of the formula (3) include diethylene glycol mono(meth)acrylate, triethylene glycol mono(meth) acrylate, tetraethylene glycol mono(meth)acrylate, dipropylene glycol mono(meth)acrylate, tripropylene glycol mono (meth)acrylate, tetrapropylene glycol mono(meth)acrylate and polytetramethylene glycol mono(meth)acrylate.

Specific examples of the polylactone mono(meth)acrylate compound of the formula (4) include 2-(meth) acryloyloxyethylhydrogen caprolactoneate, 2-(meth) acryloyloxyethylhydrogen dicaprolactonate, 2-(meth) acryloyloxyethylhydrogenpoly (polymerization degree 3–5) caprolactonate and 2-(meth)acryloyloxyethyl-2-hydroxy-6-hexanolactonate.

Further, in addition to the above compounds of the general formula (2) to (4), the active-hydrogen-containing compound (b) includes 2-(meth)acryloyloxyethyl-2-hydroxypropyl phthalate, 3-chloro-2-hydroxypropyl (meth) acrylate, 2-hydroxy-3-phenoxypropyl (meth)acrylate, and it also includes the (meth)acrylic compound containing 2 or more hydroxy groups, such as, glycerol mono(meth) acrylate, pentaerythritol mono(meth)acrylate, ethylene-oxide-modified pentaerythritol mono(meth)acrylate, trimethylolpropane mono(meth)acrylate, ethylene-oxide-modified trimethylolpropane mono(meth)acrylate.

Further, the (meth)acrylic compound having a molecule containing a carboxyl group includes maleic acid, fumaric acid, itaconic acid, citraconic acid, alkyl or alkenyl monoesters of these, phthalic acid β-(meth)acryloxyethyl monoester, isophthalic acid β-(meth)acryloxyethyl monoester, terephthalic acid β-(meth)acryloxyethyl monoester, succinic acid β-(meth)acryloxyethyl monoester, acrylic acid and methacrylic acid.

In the present invention, the non-functional (meth)acrylic compound (b-2) of the following formula (8) is introduced into the multi-branched compound by allowing it to react with the polyamino compound (a) in a Michael addition reaction, for controlling the introduction ratio of vinyl groups into the multi-branched compound. The introduction of the non-functional (meth)acrylic compound (b-2) serves to accomplish both an increase in the molecular weight of the multi-branched compound and a decrease in the viscosity of the multi-branched compound while retaining the curability of the multi-branched compound. Further, it is also effective for improving the solubility with other components.

$$CH_2=C(R^1)COO-R^6 \qquad (8)$$

wherein $R^1$ is a hydrogen atom or methyl and $R^6$ is $-C_vH_{2v+1}$, $-(C_xH_{2x}O)_mR^7$ or $-C_yH_{2y}O(COC_zH_{2z}O)_kR^7$ in which $R^7$ is a phenyl group or an alkyl group having 1 to 22 carbon atoms, preferably 1 to 16 carbon atoms, v is an integer of 1 to 25, preferably 4 to 16, x is an integer of 1 to 6, preferably 2 to 4, y is an integer of 2 to 22, preferably 2 to 16, z is an integer of 2 to 15, preferably 3 to 5, m is an integer of 1 to 25, preferably 2 to 16, and k is an integer of 1 to 20, preferably 1 to 5. When v, x, m, y or z is outside the above range, undesirably, a long-chain group is liable to undergoes crystallization, or a multi-branched compound has a molecular weight larger than necessary so that the viscosity thereof is too high. Further, $R^1$ in formulae (2) to (8) is preferably a hydrogen atom, since the Michael addition reaction can be carried out under mild conditions.

More specifically, examples of alkyl (meth)acrylate compound which is a compound of the formula (8) in which $R^6$ is $-C_vH_{2v+1}$ which is linear or branched include methyl (meth)acrylate, ethyl (meth)acrylate, butyl (meth)acrylate, pentyl (meth)acrylate, heptyl (meth)acrylate, hexyl (meth) acrylate, octyl (meth)acrylate, 2-ethylhexyl (meth)acrylate, nonyl (meth)acrylate, decyl (meth)acrylate, undecyl (meth) acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth) acrylate, heneicosyl (meth)acrylate and docosyl (meth) acrylate.

Examples of alkylene glycol (meth)acrylate compound which is a compound of the formula (8) in which $R^6$ is $-(C_xH_{2x}O)_mR^7$ include compounds containing alkoxy group such as methoxydiethylene glycol (meth)acrylate, methoxytriethylene glycol (meth)acrylate, phenoxydiethylene glycol (meth)acrylate, phenoxyethylene glycol (meth) acrylate, methoxytriethylene glycol (meth)acrylate, methoxytetraethylene glycol (meth)acrylate, ethoxytetraethylene glycol (meth)acrylate, propoxytetraethylene glycol (meth) acrylate, n-butoxytetraethylene glycol (meth)acrylate, pentoxytetraethylene glycol (meth)acrylate, methoxytripropylene glycol (meth)acrylate, methoxytetrapropylene glycol (meth)acrylate, ethoxytetrapropylene glycol (meth)acrylate, propoxytetrapropylene glycol (meth)acrylate, n-butoxytetrapropylene glycol (meth)acrylate, n-pentaoxytetrapropylene glycol (meth)acrylate, polytetramethylene glycol (meth)acrylate, methoxypolytetramethylene glycol (meth )acrylate, methoxypolyethylene glycol (meth)acrylate, ethoxypolyethylene glycol (meth)acrylate, and compounds containing phenoxy group such as phenoxytriethylene glycol (meth)acrylate, phenoxytetraethylene glycol (meth)acrylate, phenoxyhexaethylene glycol (meth) acrylate, phenoxypolyethylene glycol (meth)acrylate and phenoxytetrapropylene glycol (meth)acrylate.

Further, examples of polylactone (meth)acrylate compound which is a compound of the formula (8) in which $R^6$ is $-C_yH_{2y}O(COC_zH_{2z}O)_kR^7$ include 2-(meth) acryloyloxyethylhydrogen methoxycaprolactonate, 2-(meth)acryloyloxyethylhydrogen methoxydicaprolactonate, 2-(meth) acryloyloxyethylhydrogen methoxypoly (polymerization degree 3 to 5) caprolactonate and 2-(meth)acryloyloxyethyl-2-methoxy-6-hexanolactonate.

In the present invention, the core compound containing non-functional group can be effectively obtained by reacting the above amino compound (a) with a mixture of the active-hydrogen-containing (meth)acrylic compound (b-1) and the non-functional acrylic compound (b-2) in a Michael addition reaction. The amount of the active-hydrogen-containing (meth)acrylic compound (b-1) and the non-functional acrylic compound (b-2) is not specially limited so long as at least one active-hydrogen-containing (meth) acrylic compound (b-1) is bonded to the amino compound (a). However, the total amount of the active-hydrogen-containing (meth)acrylic compound (b-1) and the non-functional acrylic compound (b-2) to be added to the polyamino compound is preferably 10 to 95%, more preferably 50 to 90% on the basis of all the active hydrogen atoms derived from the polyamino compound (a). When the above amount is less than the above lower limit, undesirably, it is difficult to obtain the multi-branched compound, and features of the active-hydrogen-containing (meth)acrylic compound (b-1) and the non-functional acrylic compound (b-2) are not fully reflected.

Further, the amount ratio of the active-hydrogen-containing (meth)acrylic compound (b-1) and the non-functional (meth)acrylic compound (b-2) differs depending upon the total number of active hydrogen atoms derived from the polyamino compound, while the (b-1):(b-2) amount ratio is preferably 1:99 to 100:0, more preferably 20:80 to 95:5 molar ratio. When the amount of the active-hydrogen-containing (meth)acrylic compound (b-1) is too small, undesirably, it is difficult to obtain sufficient curability.

The reaction for obtaining the above core compound can be carried out according to a conventional method. The use of an alcohol such as methanol or ethanol as a solvent for the reaction serves to prevent the occurrence of a side reaction. When the solvent is used, the amount of the solvent is preferably 1 to 100 times the amount of the polyamino compound (a). No heating is specially required. However, when the polyamino compound (a) or the (meth)acrylic compound (b-1) or (b-2) has a large molecular weight, heating at a temperature between 30° C. and 70° C. is preferred. While the time period for the reaction differs depending upon kinds of the polyamino compound (a) and the (meth)acrylic compound (b-1) or (b-2) and a reaction temperature, the reaction time period is 30 minutes to 72 hours. Generally, the reaction is completed in one day at 25° C., or in 1 to 10 hours under heat at 50 to 100° C.

In the present invention, the vinyl-group-containing compound (c) (to be sometimes referred to as "vinyl compound (c)" hereinafter) is introduced into the core compound for imparting the core compound (a) with reactivity. While the vinyl compound (c) is not specially limited so long as it has a polymerizable double bond, preferred structures thereof are as follows.

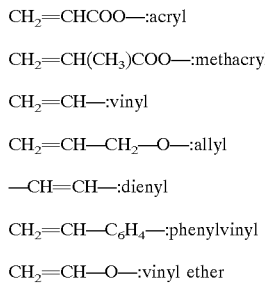

Of the above vinyl groups, in view of the reactivity in radiation-curing, an acryl group is preferred for UV curing, and a methacryl group is prefered from the aspects of reactivity and safety, since it shows relatively high curing properties in electron beam curing. It is also preferred to use a combination of an acryl group and a vinyl ether group in view of reactivity.

In the present invention, the multi-branched compound can be obtained by introducing the vinyl group into the core compound. Basically, the multi-branched compound is obtained by a reaction between the active-hydrogen-containing functional group of the core compound and the vinyl-group-containing compound (c) having a functional group reactive with active hydrogen. The core compound has an active-hydrogen-containing functional group such as hydroxyl, carboxyl or amino group. The vinyl-group-containing compound (c) having a functional group reactive with active hydrogen is not specially limited so long as it is a compound having a functional group reactive with the above active-hydrogen-containing functional groups.

Examples of the vinyl-group-containing compound (c) having a functional group reactive with active hydrogen include an epoxy-group-containing vinyl compound, an alkoxysilyl-group-containing vinyl compound, a phosphoric-acid-group-containing vinyl compound and an isocyanate-group-containing vinyl compound.

The epoxy-group-containing vinyl compound includes glycidyl (meth)acrylate, allyl glycidyl ether, epoxycyclohexylmethyl (meth)acrylate, epoxycyclohexylmethylpolycarprolactone (meth)acrylate, vinylcyclohexyl epoxide and methylglycidyl (meth)acrylate.

The alkoxysilyl-group-containing vinyl compound includes vinyltrimethoxysilane, vinyltriethoxysilane, 3-(meth)acryloxypropyltrimethoxysilane, γ-(meth)acryloxypropylmethyldimethoxysilane and γ-(meth)acryloxypropyltrimethoxysilane.

The phosphoric-acid-group-containing vinyl compound includes acid phosphooxyethyl (meth)acrylate, 3-chloro-2-acid phosphooxypropyl (meth)acrylate, acid phosphooxypropyl (meth)acrylate, acid phosphooxyethyl acrylate and acid phosphosphooxypolyoxyethylene glycol mono(meth)acrylate.

When the active-hydrogen-containing terminal functional group of the core compound (a) used in the present invention is a hydroxyl group, a vinyl group can be introduced into the core compound by the use of an isocyanate-group-containing vinyl compound whose reaction with a hydroxyl group proceeds under mild conditions. It can be said that the above method is preferred in view of the stability of the terminal vinyl group. The isocyanate-group-containing vinyl compound includes methacryloyloxyethyl isocyanate (MOI), vinyl isocyanate, allyl isocyanate, methacryloyl isocyanate (MAI) and 3-isopropenyl-α,α-dimethylbenzyl isocyanate (TMI).

In the present invention, further, a compound obtained by reacting equimolar amounts of a diisocyanate compound and a vinyl compound containing a functional group reactive with an isocyanate group can be also used as an isocyanate-group-containing vinyl compound.

The above diisocyanate compound includes hexane 1,6-diisocynate, isophorone diisocyanate, 4,4'-diphenylmethane diisocyanate, polymeric diphenylmethane diisocyanate, xylylene diisocyanate, tolylene 2,4-diisocyanate, toluene diisocyanate, toluene 2,4-diisocyanate, hexamethylene diisocyanate, 4-methyl-m-phenylene diisocyanate, naphthylene diisocynate, p-phenylene diisocyanate, tetramethylxylylene diisocyanate, cyclohexylmethane diisocyanate, hydrogenated xylylene diisocyanate, cyclohexyl diisocyanate, 2,2,4-trimethylhexamethylene diisocyanate, 2,4,4-trimethylhexamethylene diisocyanate, m-tetramethylxylylene diisocyanate, p-tetramethylxylylene diisocyanate and dimeric acid diisocyanate.

The above vinyl compound containing a functional group reactive with an isocyanate group includes vinyl compounds containing an amino group, a hydroxyl group and a carboxyl group. Vinyl compounds containing a hydroxyl group and a carboxyl group are preferred in view of reactivity with an isocyanate group. As a (meth)acrylic compound having a hydroxyl group, a compound which is included in the above (meth)acrylic compounds and has only one hydroxyl group can be used. A compound having a relatively lower molecular weight is preferred in view of reactivity with the diisocyanate. The above compound includes, for example, 4-hydroxybutyl (meth)acrylate, 2-hydroxyethyl (meth) acrylate and 2-(meth)acryloyloxyethylhydrogen caprolactonate.

In the present invention, the ratio of the introduced vinyl groups is not specially limited so long as at least one vinyl group is introduced on the basis of all the active hydrogen atoms present in the core compound. The ratio of the introduced vinyl groups is preferably 10 to 95%, more preferably 20 to 80%. When the above ratio is smaller than the above lower limit, undesirably, no sufficient curability is obtained. When it exceeds the above upper limit, undesirably, an obtained multi-branched compound has a high viscosity, is poor in solubility with other component, and the properties of a coating such as adhesion is degraded.

For example, the amount of the isocyanate-group-containing vinyl compound is not specially limited so long as an isocyanate-group-containing vinyl compound is bonded to at least one active hydrogen atom present in the core compound derived from the polyamino compound or the active-hydrogen-containing (meth)acrylic compound (b-1). The amount of the isocyanate-group-containing vinyl compound is preferably 10 to 95%, more preferably 20 to 80% based on the total amount of active hydrogen atoms which are present in the core compound.

When the above isocyanate-group-containing vinyl compound is added, a catalyst used for general urethane synthesis, e.g., a tin-containing catalyst such as tin 2-ethylhexanoate may be added as required. The amount of the catalyst is preferably 0.01 to 1% by weight based on the isocyanate-group-containing vinyl compound.

The multi-branched compound obtained in the present invention is the state of a liquid at 30° C. having a number average molecular weight of 200 to 10,000, preferably 300 to 5,000, more preferably 400 to 4,000 and a viscosity (measured at 30° C.) of 100,000 cps or less, preferably 50,000 to 500 cps, more preferably 2,000 to 100 cps. When the molecular weight of the multi-branched compound is smaller than the above lower limit, undesirably, curing-induced shrinkage occurs extremely. When the above molecular weight is high, a high molecular weight is not a particular problem so long as a curable composition containing a multi-branched compound has a viscosity sufficient for coating or forming a film. However, when the molecular weight is greater than the above upper limit, the viscosity tends to increase. Further, a viscosity exceeding the above upper limit is undesirable in view of solubility with other component and coating properties.

The multi-branched compound obtained according to the present invention can be used as a curable resin material as it is. For adjusting the viscosity of a composition and the physical properties of a cured product, the multi-branched compound may be prepared as a composition by mixing it with a polymerizable unsaturated-group-containing compound (B) other than the multi-branched compound. The polymerizable unsaturated-group-containing compound (B) includes an acrylic compound and a vinyl compound. Of these, a (meth)acrylic compound is preferred in view of safety and availability.

The above (meth)acrylic compound includes monofunctional (meth)acrylic compounds such as methyl (meth) acrylate, butyl (meth)acrylate, 2-hydroxyethyl (meth) acrylate, phenoxyethyl (meth)acrylate, phenoxymethyl (meth)acrylate, benzyl (meth)acrylate, isobornyl (meth) acrylate, dicyclopentynyl (meth)acrylate and (dicyclopentenyl)oxy (meth)acrylate; bifunctional (meth) acrylic compounds such as ethylene glycol di(meth)acrylate, diethylene glycol di(meth)acrylate, triethylene glycol di(meth)acrylate, polyethylene glycol di(meth)acrylate, tripropylene glycol di(meth)acrylate, polypropylene glycol di(meth)acrylate, 1,3-butylene glycol di(meth)acrylate, 1,6-hexanediol (meth)acrylate, 2-methyl-octanediol diacrylate, 1,9-nonanediol di(meth)acrylate, neopentyl glycol di(meth) acrylate, 2,2-bis[4-{(meth)acryloxy diethoxy}phenyl] propane, 2,2-bis[4-{(meth)acryloxyethoxy}phenyl]propane, 2,2-bis[4-{(meth)acryloxy polyethoxy)phenyl}propane, 2,2-bis[4-{(meth)acryloxy dipropoxy)phenyl}propane, 2,2-bis[4-{(meth)acryloxypropxy)phenyl}propane, 2,2-bis[4-{(meth)acryloxy polupropoxy)phenyl}propane and tricyclo [$5.2.1.0^{2.6}$]decanyl di(meth)acrylate; and trifunctional or higher-functional (meth)acrylic compounds such as trimethylolpropane tri(meth)acrylate, tetramethylolmethane tri(meth)acrylate, tetramethylolethane tri(meth)acrylate, tetramethylolmethane tetra(meth)acrylate, ethylene-oxide-modified trimethylolpropane tri(meth)acrylate pentaerythritol tetra(meth)acrylate, pentaerythritol try(meth) acrylate and dipentaerythritol hexa(meth)acrylate.

The above vinyl compound includes methyl vinyl ether, ethyl vinyl ether, propyl vinyl ether, isobutyl vinyl ether, octadecyl vinyl ether, vinyl cyclohexyl ether, vinyl-4-hydroxybutyl ether, butanediol-1,4-divinyl ether, vinylpyrrolidone, vinylcaprolactam, vinylcarbozole, vinyl-1-imidazole, divinylethyleneurea, N-vinylformamide, N-vinylformalin, allyl glycidyl ether and allyl chloride.

Further, a diene compound, a styrene compound or an unsaturated fatty acid compound may be used.

Of the above polymerizable unsaturated-group-containing compounds, compounds having an SP value of 8.5 to 12.5 are preferred, and compound having an SP value of 9.0 to 10.0 are more preferred, as a reactive diluent for the vinyl-group-containing multi-branched compound (A). Compounds having an SP value in the above range are excellent in solubility with the vinyl-group-containing multi-branched compound or general reactive compounds, and in the above range, the feature of a multi-branched compound whose chain does not extend much can be utilized serve to work the features of the multi-branched compound whose chain is not easily expandable.

In the present invention, the amount ratio of the multi-branched compound (A) and the polymerizable unsaturated-group-containing compound (B), (A):(B), is preferably 5:95 to 99:1, more preferably 20:80 to 80:20. When the amount of the polymerizable unsaturated-group-containing compound (B) is greater than the above, undesirably, curing properties are degraded, that is, shrinkage is extremely caused during the curing and a cured product is fragile.

In the present invention, further, the pre-curing viscosity of a curable resin composition containing the multi-branched compound (A) and the polymerizable unsaturated-group-containing compound (B) is limited depending upon the performance of an applicator or a coater or a use, while the above viscosity measured at 30° C. is preferably 10 to 50,000 cps, more preferably 20 to 20,000 cps.

In the present invention, a solvent may be used for adjusting the above composition to an intended viscosity.

The above solvent includes water, hydrocarbon solvents such as cyclohexane, toluene and xylene, halogenated hydrocarbon solvents such as methylene chloride, chloroform and 1,1,1-trichloroethane, alcohol solvents such as isopropanol, n-butanol and n-amyl alcohol, ether solvents such as 1,4-dioxane and tetrahydrofuran, ketone solvents such as acetone, methyl ethyl ketone and methyl isobutyl ketone, ester solvents such as ethyl acetate, and n-butyl acetate and n-amyl acetate.

In the present invention, the weight ratio of the total weight of the multi-branched compound (A) and the polymerizable unsaturated-group-containing compound (B) and the solvent (C), [(A)+(B)]:(C), is in the range of from 100:0 to 20:80, preferably from 100:0 to 60:40. When the weight ratio of (C) is larger than the above range, undesirably, a composition is poor in coating properties.

In the present invention, further, the pre-curing viscosity of a curable resin composition containing the multi-branched compound (A), the polymerizable unsaturated-group-containing compound (B) and the solvent is limited depending upon the performance of an applicator or a coater or a use, while the above viscosity measured at 30° C. is preferably 1 to 5,000 cps (30° C.), more preferably 5 to 1,000 cps.

The multi-branched compound and the curable composition obtained according to the present invention can be used as a film-forming material such as a coating composition or a vehicle for an ink or a molding material or an adhesive. Further, the multi-branched compound or the resin composition obtained according to the present invention can be adjusted in viscosity, film-formability and performances of a film or coating by mixing it with any one of known generally used compound such as polyisocyanate, melamine, an amino resin, a phenolic resin, a polyamide resin, a cellulose derivative, a vinyl-containing resin, a polyolefin, a natural rubber derivative, an acrylic resin, an epoxy resin, a polyester, a polystyrene, an alkyd resin, a rosin-modified alkyd resin or a linseed-oil-modified alkyd resin, and drying oils such as linseed oil, tung oil and soybean oil. However, the amount of any one of the above additives is preferably 40% by weight or less, more preferably 20% by weight or less. Further, a compatibilizer, a surfactant or a lubricant may be added. The amount of these is 10% by weight or less, preferably 5% by weight or less.

The multi-branched compound or the curable composition according to the present invention can be used as a printing ink or a colored coating composition by incorporating a proper amount of a colorant such as a dye or a pigment selected from carbon black, titanium white, phthalocyanine, an azo dyestuff or quinacridone, or an inorganic filler such as Si fine particles, mica or calcium carbonate.

Further, for curing with a heater or curing with irradiation with radiation, a known initiator or a known photopolymerization sensitizer may be added.

The multi-branched compound or the curable composition according to the present invention can be applied to, or coated on, a plate, a film or a sheet formed of a metal, plastic or paper with a roll coater, a bar coater or a knife coater.

The multi-branched compound or the curable composition according to the present invention can be applied to metal plates such as various steel plates and aluminum plates and substrates of plastic films, paper and plastic film laminate paper by a conventional coating method using a roll coater or a knife coater or a conventional printing method such as an offset printing method, a gravure printing method, a letterpress printing method or a silk screen printing method, to form a film or coating having a thickness of 0.1 to 500 μm. Further, the above compound or composition can be cured by heating or irradiation with radiation such as electron beam, ultraviolet light, visible light or infrared light.

For curing by irradiation with electron beam, there is used an electron beam irradiation apparatus having an acceleration voltage preferably in the range of 10 to 1,000 kV, more preferably 30 to 300 kV. An electron beam curing system having a low acceleration voltage is effective and preferred for curting a thin film since energy can be concentrated on a surface. The dose is preferably 1 to 1,000 kGy, more preferably 5 to 200 kGy. When the dose is less than the above lower limit, it is difficult to obtain a sufficiently cured product. When the dose is larger than the above upper limit, undesirably, a coating, a film or a substrate is greatly damaged.

In the present invention, forming a film or a coating refers to the formation of a film or a coating having a thickness of 0.1 to 500 μm on a substrate formed of paper, a metal, plastic or ceramic by a printing method or an application method.

EXAMPLES

The present invention will be explained more in detail hereinafter, while the present invention shall not be limited thereto.

<Methods of structural analysis, measurement of number average molecular weight and measurement of viscosity>

1) Structural analysis:

Structures of synthesized multi-branched compounds were analyzed by $^1$H-NMR.

2) Number average molecular weight: Gel permeation chromatography (Tosoh Corp SC-8020)

A calibration curve of gel permeation chromatograph (GPC) was prepared from several kinds of multi-branched compounds having known structures which were analyzed by $^1$H-NMR, and results obtained by GPC measurement on the basis of the calibration curve were used.

3) Viscosity: Rheometer (RDS-II, RFS-II, supplied by Rheometrics)

A sample was measured for a viscosity with a rheometer RDS-II (for measurement of high viscosity) or RFS-II (for measurement of low viscosity) depending upon the viscosity of the sample, and an obtained by static method (value at a shear rate of 1 to 10/sec) was used.

<Electron beam irradiation apparatus and conditions of irradiation>

1) Area beam electron beam irradiation apparatus, Curetron EBC-200-20-30 (Nisshin High Voltage)

Electron beam acceleration rate: 200 kV

A dose was adjusted in a range of 5 to 80 kGy on the basis of an electric current amount.

2) MIN-EB (Supplied by AIT)

Electron beam acceleration rate: 60 kV

A dose was adjusted in a range of 5 to 80 kGy on the basis of the velocity of a belt conveyer.

Compounds Used in Examples and Comparative

Examples or abbreviations therefor were as follows.

1) Polyamino compound (a)

ED: ethylenediamine

MXDA: m-xylenediamine

MXDA-EO2: ethylene-oxide-modified m-xylenediamine (amine/ethylene oxide=1/2 (mol/mol))

MXDA-PO2: propylene-oxide-modified m-xylenediamine (amine/propylene oxide=1/2 (mol/mol))

DETA: diethylenetriamine

IPDA: isophoronediamine

2) Active-hydrogen-containing (meth)acrylic compound (b-1)

4HBA: 4-hydroxybutyl acrylate

HEA: 2-hydroxyethyl acrylate

PPG6A: polypropylene glycol (polymerization degree of PPG chain=6) acrylate

PEG7A: polyethylene glycol (polymerization degree of PEG chain=7) acrylate

PCL2A: 2-(meth)acryloyloxyethylhydrogen dicaprolactonate (Praccel FA-2, supplied by Daicel Chemical Industries, Ltd.)

SA: 2-acryloyloxyethylhydrogen succinate

3) Non-functional (meth)acrylic compound (b-2)

BA: butyl acrylate

EHA: 2-ethylhexyl acrylate

LA: lauryl acrylate

4) Isocyanate-group-containing vinyl compound (c)

MOI: methacryloyloxyethyl isocyanate

5) Polymerizable unsatured-group-containing compound (B)

PEG9DA: polyethylene glycol diacrylate (Mn=508, $\eta$=36.2 cps)

NODA: 1,9-nonanediol diacrylate (Mn=268, $\eta$=7.3 cps)

TPGDA: tripropylene glycol diacrylate (Mn=300, $\eta$=12 cps)

TMPT3EO: ethylene-oxide-modified trimethylolpropane triacrylate (Mn=428, $\eta$=50 cps)

DPHA: dipenthaerythritol hexaacrylate (Mn=550, 5900 cps)

6) Solvent

MEK: methyl ethyl ketone

Toluene:

n-Butanol

Ethyl acetate

Comparative Example used UV-1700B (Shikoh UV-1700B (Mn=2,000, $\eta$=22,500 cps), supplied by Nippon Gosei Kagaku Kogyo) as a linear urethane acrylate.

Synthesis Example 1

Equimolar adduct of tolylene diisocynate (TDI) with 4HBA

A 1,000 ml four-necked round-bottomed flask having a stirrer, a nitrogen introducing tube, a temperature sensor, a condenser and a dropping funnel charged with a mixture of 144 g of 4HBA and 144 g of ethyl acetate was charged with 174 g of TDI, 174 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 2

Equimolar adduct of TDI with HEA

A 1,000 ml four-necked round-bottomed flask having a stirrer, a nitrogen introducing tube, a temperature sensor, a condenser and a dropping funnel charged with a mixture of 116 g of HEA and 120 g of ethyl acetate was charged with 174 g of TDI, 174 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 3

Equimolar adduct of IPDI with HEA

A 1,000 ml four-necked round-bottomed flask having a stirrer, a nitrogen introducing tube, a temperature sensor, a condenser and a dropping funnel charged with a mixture of 116 g of HEA and 120 g of ethyl acetate was charged with 222 g of IPDI, 220 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 4

Equimolar adduct of hexamethylene diisocynate (HMDI) with HEA

A 1,000 ml four-necked round-bottomed flask having a stirrer, a nitrogen introducing tube, a temperature sensor, a condenser and a dropping funnel charged with a mixture of 116 g of HEA and 120 g of ethyl acetate was charged with 168 g of HMDI, 170 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 5

Equimolar adduct of IPDI with 4HBA

A 1,000 ml four-necked round-bottomed flask having a stirrer, a nitrogen introducing tube, a temperature sensor, a condenser and a dropping funnel charged with a mixture of 144 g of 4HBA and 144 g of ethyl acetate was charged with 222 g of IPDI, 220 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 6

Equimolar adduct of HMDI with 4HBA

A 1,000 ml four-necked round-bottomed flask having a stirrer, a nitrogen introducing tube, a temperature sensor, a condenser and a dropping funnel charged with a mixture of 144 g of 4HBA and 140 g of ethyl acetate was charged with 168 g of HMDI, 170 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 7

Equimolar adduct of IPDI with PPG6A

A 2,000 ml four-necked round-bottomed flask having a stirrer, a nitrogen introducing tube, a temperature sensor, a condenser and a dropping funnel charged with a mixture of 510 g of PPG6A and 510 g of ethyl acetate was charged with 222 g of IPDI, 222 g of ethyl acetate and 0.3 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Example 1

A 1000 ml four-necked round-bottomed flask having a stirrer, a nitrogen introducing tube, a temperature sensor and a condenser was charged with 20 g of ED, 192 g of 4HBA, 70 g of ethyl acetate and 20 g of methanol, and the mixture in the flask was refluxed with a hot water bath at 75° C. for 3 hours. Then, part of the reaction mixture was sampled and measured for $^1$H-NMR to show that a proton peak originated from an acryl group had almost disappeared. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 99%). Then, the temperature of the hot water bath was decreased to 60° C., 400 g of ethyl acetate and 195 g of MOI were added, and further, after 10 minutes, 1 g of tin 2-ethylhexanoate was added. The mixture was continuously stirred under heat for 3 hours, and a termination point was confirmed on the basis of IR chart. Further, the ethyl acetate used as a reaction solvent was removed with an evaporator to give a multi-branched compound as an end product. FIG. 1 shows the $^1$H-NMR chart of the obtained multi-branched compound, and its assignment is shown below. Table 1 also shows the physical property values thereof.

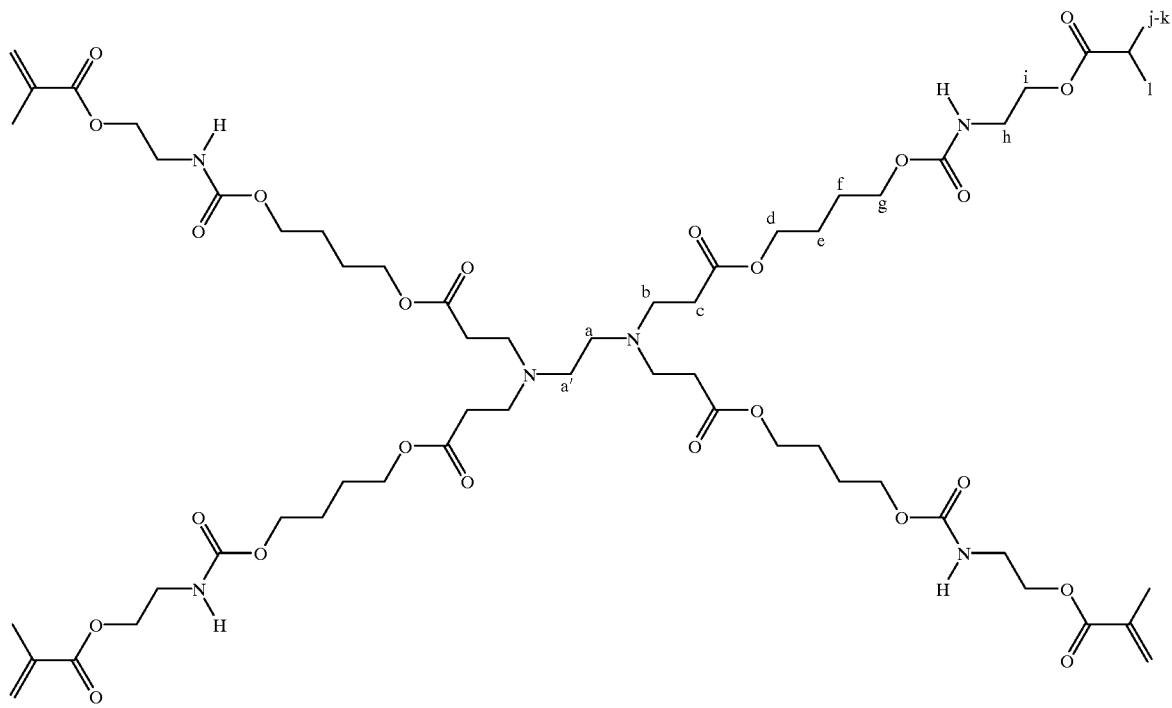

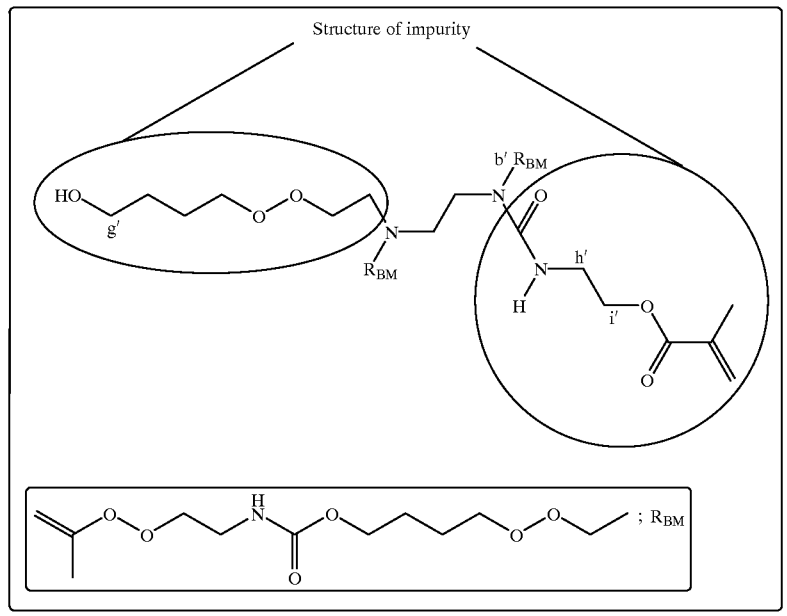

Example 2

Figure 2:
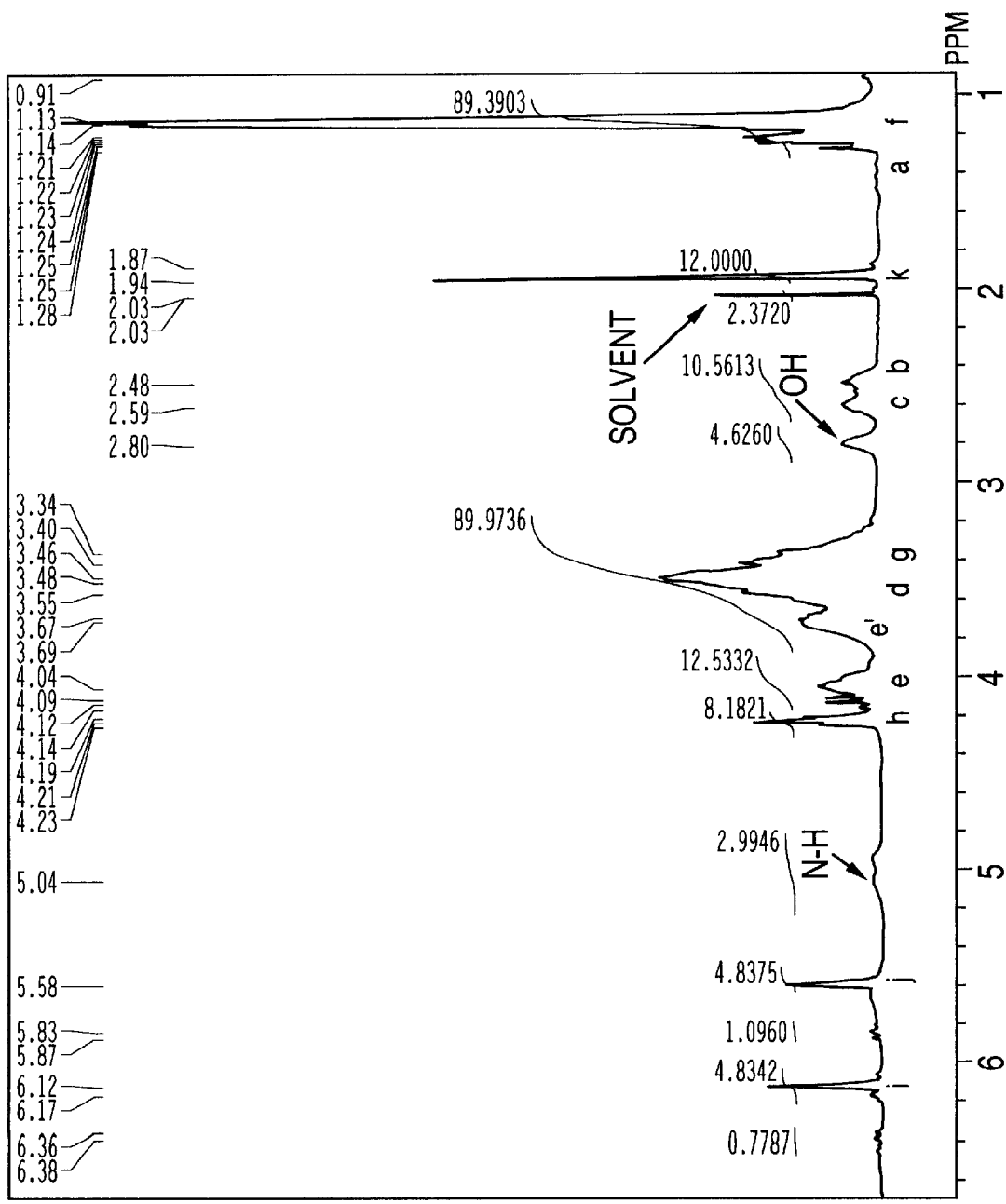
FIG. 2 shows $^1$H-NMR chart of a multi-branched compound obtained in Example 2.

A 2,000 ml four-necked round-bottomed flask having a stirrer, a nitrogen introducing tube, a temperature sensor and a condenser was charged with 20 g of ED, 649 g of PPG6A, 290 g of ethyl acetate and 20 g of methanol, and the mixture in the flask was refluxed with a hot water bath at 75° C. for 5 hours. Then, part of the reaction mixture was sampled and measured for $^1$H-NMR to show that a proton peak originated from an acryl group had almost disappeared. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, while the temperature of the hot water bath was maintained at 70° C., 860 g of ethyl acetate and 190 g of MOI were consecutively added, and further, after 10 minutes, 1 g of tin 2-ethylhexanoate was added. The mixture was continuously stirred under heat for 3 hours, and a termination point was confirmed on the basis of IR chart. Further, the ethyl acetate used as a reaction solvent was removed with an evaporator, to give a multi-branched compound as an end product. FIG. 2 shows the $^1$H-NMR chart of the obtained multi-branched compound, and its assignment is shown below. Table 1 also shows the physical property values thereof.

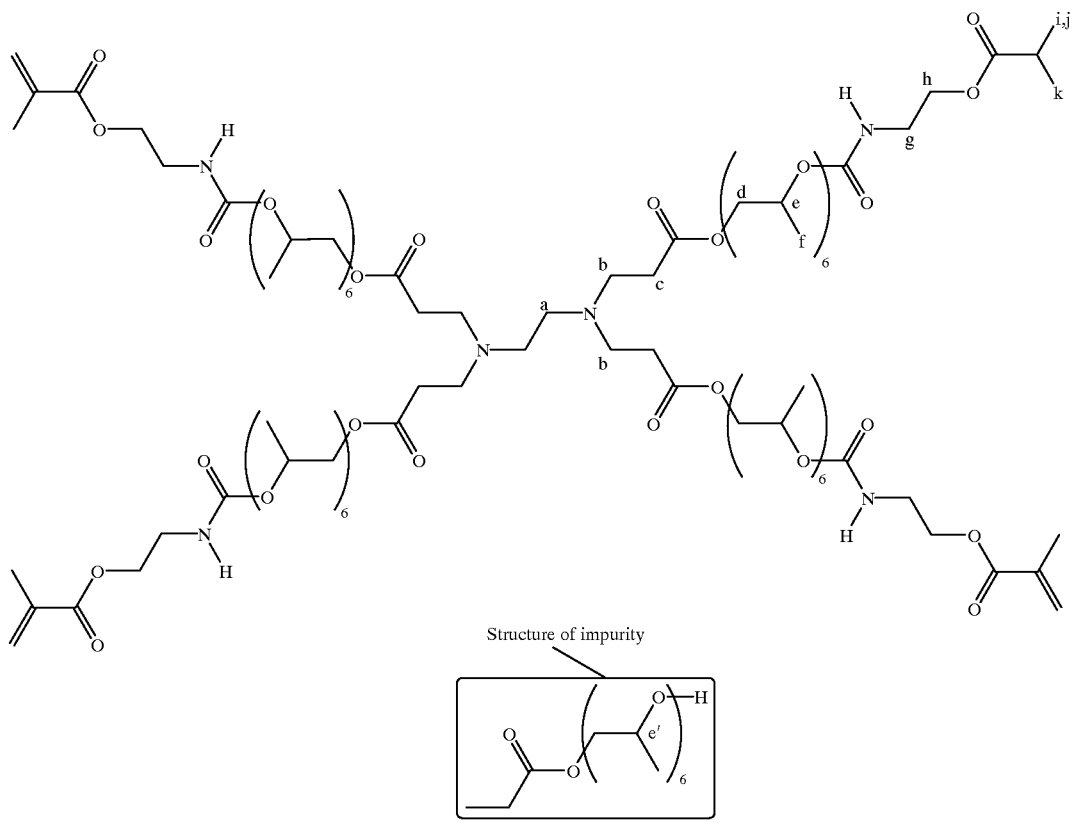

Structure of impurity

Example 3

Figure 3:
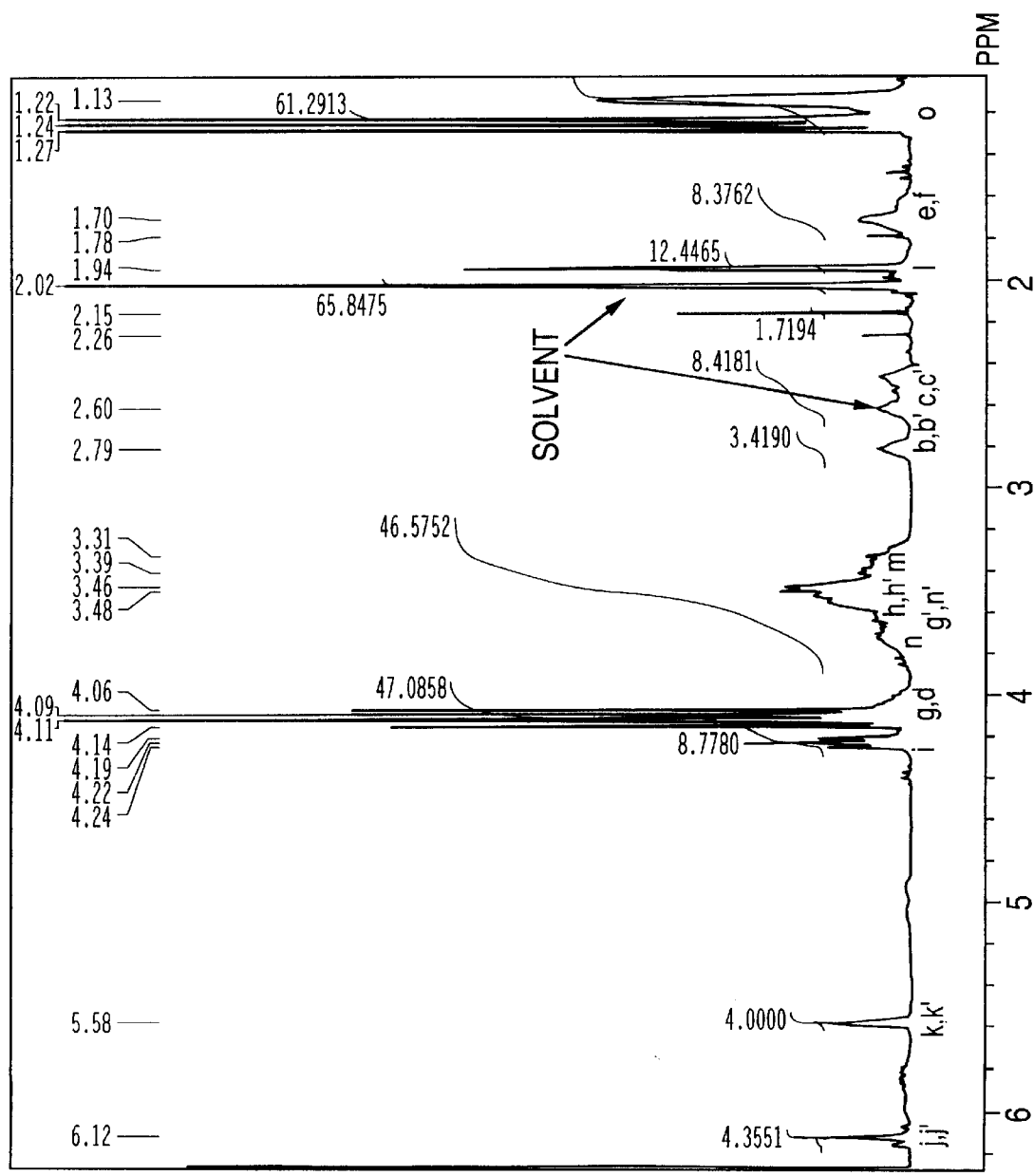
FIG. 3 shows $^1$H-NMR chart of a multi-branched compound obtained in Example 3.

A 2,000 ml four-necked round-bottomed flask having a stirrer, a nitrogen introducing tube, a temperature sensor and a condenser was charged with 20 g of ED, 325 g of PPG6A, 96 g of 4HBA, 189 of ethyl acetate and 20 g of methanol, and the mixture in the flask was refluxed with a hot water bath at 75° C. for 5 hours. Then, part of the reaction mixture was sampled and measured for $^1$H-NMR to show that a proton peak originated from an acryl group had almost disappeared. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, while the temperature of the hot water bath was maintained at 70° C., 630 g of ethyl acetate and 190 g of MOI were consecutively added, and further, after 10 minutes, 1 g of tin 2-ethylhexanoate was added. The mixture was continuously stirred under heat for 3 hours, and a termination point was confirmed on the basis of IR chart. Further, the ethyl acetate used as a reaction solvent was removed with an evaporator, to give a multi-branched compound as an end product. FIG. 3 shows the $^1$H-NMR chart of the obtained multi-branched compound, and its assignment is shown below. Table 1 also shows the physical property values thereof.

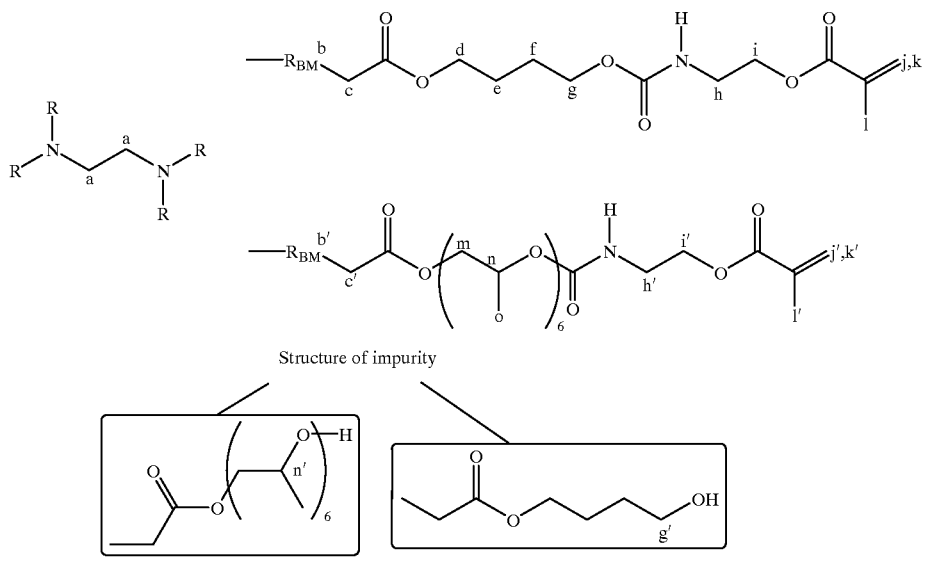

Structure of impurity

Wherein, R is $R_{BM}$ or $R_{PM}$, and $R_{BM}$:$R_{PM}$=1:1 mole ratio.

Examples 4–24

A four-necked round-bottomed flask having a stirrer, a nitrogen introducing tube, a temperature sensor and a condenser was charged with a polyamino compound (a) shown in Table 1 and an equivalent amount of ethyl acetate, and to this mixture was added a solution of 75% by weight of an active-hydrogen-containing (meth)acrylic compound (b-1) in ethyl acetate with stirring. In any case other than a case using HEA as an active-hydrogen-containing compound (b-1), methanol in an amount equimolar to that of the polyamino compound (a) was added. The above mixture was refluxed with a hot water bath at 75° C. for 4 hours. Then, part of the reaction mixture was sampled and measured for $^1$H-NMR to confirm a reaction termination point on the basis of a proton peak originated from an acryl group. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (core compound). Then, the temperature of the hot water bath was decreased to 60° C., ethyl acetate was newly added to attain an NV 50%. An isocyanate-group-containing vinyl compound (c) in a molar amount equivalent to the molar amount of active hydrogen of the core compound was added, and further, the reaction mixture was diluted with ethyl acetate such that the reaction system as a whole had a concentration of 50%. Further, after 10 minutes, tin 2-ethylhexanoate in an amount of 0.5% by weight based on the isocyanate-group-containing vinyl compound (c) was added. The mixture was continuously stirred under heat for at least 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product. Table 1 shows both a composition of raw materials for the synthesis of the multi-branched compound and properties of the obtained multi-branched compound. Further, for comparison, commercially available dipentaerythritol hexaacrylate (DHPA) and ethylene-oxide-modified pentaerythritol triacrylate (TMPT3EO, TMPT6EO) were evaluated in the same manner, and Table 1 also shows the results as Comparative Examples 1 to 3.

TABLE 1

| | Composition of raw materials (a)/(b-1)/(c) (Molar ratio) | Number of functional groups | Purity (%) | Average molecular weight (Mn) | Viscosity (30° C., 10-/s) (cps) |
|---|---|---|---|---|---|
| Ex. 1 | ED/4HBA/MOI = 1/4/4 | 4 | 90 | 1,161 | 6,120 |
| Ex. 2 | ED/PPG6A/MOI = 1/4/4 | 4 | 80 | 2,310 | 930 |
| Ex. 3 | ED/(4HBA/PPG6A)/MOI = 1/(2/2)/4 | 4 | 86 | 1,752 | 2,730 |
| Ex. 4 | ED/HEA/MOI = 1/4/4 | 4 | 95 | 1,101 | 9,240 |
| Ex. 5 | ED/PEG7A/MOI = 1/4/4 | 4 | 78 | 2,095 | 1,030 |
| Ex. 6 | ED/PCL2A/MOI = 1/4/4 | 4 | 86 | 1,839 | 2,580 |
| Ex. 7 | ED/SA/MOI = 1/4/4 | 4 | 70 | 1,193 | 6,450 |
| Ex. 8 | ED/HEA/(SyEx. 1) = 1/4/4 | 4 | 80 | 1,524 | 14,400 |
| Ex. 9 | ED/HEA/(SyEx. 5) = 1/4/4 | 4 | 86 | 1,777 | 9,870 |
| Ex. 10 | ED/HEA/(SyEx. 2) = 1/4/4 | 4 | 86 | 1,505 | 29,500 |
| Ex. 11 | ED/HEA/(SyEx. 3) = 1/4/4 | 4 | 89 | 1,720 | 12,320 |
| Ex. 12 | ED/HEA/(SyEx. 4) = 1/4/4 | 4 | 85 | 1,471 | 7,800 |
| Ex. 13 | ED/HEA/(SyEx. 6) = 1/4/4 | 4 | 82 | 1,530 | 6,420 |
| Ex. 14 | ED/4HBA/(SyEx. 3) = 1/4/4 | 4 | 82 | 1,718 | 10,965 |
| Ex. 15 | ED/4HBA/(SyEx. 4) = 1/4/4 | 4 | 76 | 1,450 | 6,942 |
| Ex. 16 | ED/4HBA/(SyEx. 6) = 1/4/4 | 4 | 76 | 1,542 | 5,714 |
| Ex. 17 | ED/PCL2A/(SyEx. 3) = 1/4/4 | 4 | 72 | 2,198 | 3,200 |
| Ex. 18 | ED/PPG6A/(SyEx. 3) = 1/4/4 | 4 | 68 | 2,619 | 1,180 |
| Ex. 19 | ED/(PPG6A/4HBA)(SyEx. 3) = 1/(2/2)/4 | 4 | 70 | 2,159 | 3,260 |
| Ex. | MXDA/4HBA/MOI = | 4 | 93 | 1,240 | 14,820 |

TABLE 1-continued

| | Composition of raw materials (a)/(b-1)/(c) (Molar ratio) | Number of functional groups | Purity (%) | Average molecular weight (Mn) | Viscosity (30° C., 10-/s) (cps) |
|---|---|---|---|---|---|
| Ex. 20 | | | | | |
| Ex. 21 | DETA/4HBA/MOI = 1/5/5 | 5 | 90 | 1,170 | 14,300 |
| Ex. 22 | MXDA/PPG6A/MOI = 1/4/4 | 4 | 87 | 2,329 | 4,730 |
| Ex. 23 | MXDA/4HBA/(SyEx. 3) = 1/4/4 | 4 | 86 | 1,777 | 17,580 |
| Ex. 24 | MXDA/PPG6A/(SyEx. 3) = 1/4/4 | 4 | 84 | 2,864 | 5,600 |
| CEx. 1 | DPHA | 6 | | 550 | 5,900 |
| CEx. 2 | TMPT3EO | 3 | | 430 | 60 |
| CEx. 3 | TMPT6EO | 3 | | 560 | 75 |

Ex. = Example, CEx. = Comparative Example
SyEx. = Synthesis Example

Examples 25–48

The multi-branched compounds obtained in Examples 1 to 24 were applied to four kinds of film (substrate size for evaluation; thickness=20 μm, width=5 cm, length=20 cm) with a #6 bar coater, and the resultant coatings were irradiated with electron beam at various doses (5, 20 and 40 kGy). Table 2 shows the used multi-branched compounds, and results of evaluations of curing properties (finger touch test→X=tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated on the basis of visual observation of deformation of substrate film, ○=free of curling, Δ=edges bending, X=film underwent curling) and abrasion resistance of the coatings obtained by the irradiation with electron beam. Table 2 also shows the evaluation results of commercially available dipentaerythritol and EO-modified pentaerythritol triacrylates (TMPT#EO, TMPT6EO) as Comparative Examples 4 to 6.

TABLE 2

| | Composition of raw materials (Molar ratio) | Curability (KGy) | | Adhesion to substrate DOSE: 20 KGy | | | | AA (%) Substrate: PET, DOSE: 20 KGy | BB | CC |
|---|---|---|---|---|---|---|---|---|---|---|
| Ex. | | 5 | 20 | PE | OPP | NY | PET | | | |
| Ex. 25 | ED/4HBA/ MOI = 1/4/4 | ○ | ○ | ○ | ○ | ○ | ○ | 100 | ○ | ○ |
| Ex. 26 | ED/PPG6A/ MOI = 1/4/4 | Δ | ○ | ○ | ○ | ○ | ○ | 96 | ○ | Δ |
| Ex. 27 | ED/(4HBA/ PPG6A)/ MOI = 1/(2/2)/4 | ○ | ○ | ○ | ○ | ○ | ○ | 97 | ○ | ○ |
| Ex. 28 | ED/HEA/ MOI = 1/4/4 | ○ | ○ | ○ | ○ | Δ | ○ | 100 | Δ | ○ |
| Ex. 29 | ED/PEG7A/ MOI = 1/4/4 | ○ | ○ | ○ | ○ | ○ | ○ | 96 | ○ | ○ |
| Ex. 30 | ED/PCL2A/ MOI = 1/4/4 | ○ | ○ | ○ | ○ | ○ | ○ | 98 | ○ | Δ |
| Ex. 31 | ED/SA/ MOI = 1/4/4 | ○ | ○ | ○ | ○ | Δ | ○ | 100 | ○ | ○ |
| Ex. 32 | ED/HEA/ (SyEx. 1) = 1/4/4 | ○ | ○ | ○ | ○ | Δ | ○ | 100 | ○ | ○ |
| Ex. 33 | ED/HEA/ (SyEx. 5) = 1/4/4 | ○ | ○ | ○ | ○ | Δ | ○ | 100 | ○ | ○ |
| Ex. 34 | ED/HEA/ (SyEx. 2) = 1/4/4 | ○ | ○ | ○ | ○ | Δ | ○ | 100 | ○ | ○ |
| Ex. 35 | ED/HEA/ (SyEx. 3) = 1/4/4 | ○ | ○ | ○ | ○ | Δ | ○ | 100 | ○ | ○ |
| Ex. 36 | ED/HEA/ (SyEx. 4) = 1/4/4 | ○ | ○ | ○ | ○ | ○ | ○ | 98 | ○ | ○ |
| Ex. 37 | ED/HEA/ (SyEx. 6) = 1/4/4 | ○ | ○ | ○ | ○ | ○ | ○ | 97 | ○ | ○ |
| Ex. 38 | ED/4HBA/ (SyEx. 3) = 1/4/4 | ○ | ○ | ○ | ○ | Δ | ○ | 100 | ○ | ○ |
| Ex. 39 | ED/4HBA/ (SyEx. 4) = 1/4/4 | ○ | ○ | ○ | ○ | ○ | ○ | 96 | ○ | ○ |
| Ex. 40 | ED/4HBA/ (SyEx. 6) = 1/4/4 | ○ | ○ | ○ | ○ | ○ | ○ | 98 | ○ | ○ |
| Ex. 41 | ED/PCL2A/ (SyEx. 3) = 1/4/4 | ○ | ○ | ○ | ○ | ○ | ○ | 98 | ○ | ○ |
| Ex. 42 | ED/PPG6A/ SyEx. 3) = 1/4/4 | ○ | ○ | ○ | ○ | ○ | ○ | 97 | ○ | Δ |
| Ex. 43 | ED/(PPG6A/ 4HBA) (SyEx. 3) = 1/(2/2)/4 | ○ | ○ | ○ | ○ | ○ | ○ | 98 | ○ | ○ |
| Ex. 44 | MXDA/ 4HBA/ MOI = 1/4/4 | ○ | ○ | ○ | ○ | Δ | ○ | 100 | ○ | ○ |
| Ex. 45 | DETA/ 4HBA/ MOI = 1/5/5 | ○ | ○ | ○ | ○ | ○ | ○ | 99 | ○ | ○ |
| Ex. 46 | MXDA/ PPG6A/ MOI = 1/4/4 | ○ | ○ | ○ | ○ | ○ | ○ | 95 | ○ | Δ |
| Ex. 47 | MXDA/ 4HBA/ (SyEx. 3) = 1/4/4 | ○ | ○ | ○ | ○ | ○ | ○ | 98 | ○ | ○ |
| Ex. 48 | MXDA/ PPG6A/ (SyEx. 3) = 1/4/4 | ○ | ○ | ○ | ○ | ○ | ○ | 96 | ○ | Δ |
| CEx. 4 | DPHA | ○ | ○ | Δ | X | X | X | 100 | X | ○ |
| CEx. 5 | TMPT3EO | ○ | ○ | X | ○ | X | ○ | 100 | X | ○ |
| CEx. 6 | TMPT6EO | ○ | ○ | X | X | X | ○ | 98 | Δ | Δ |

AA: Solvent resistance, BB = Curl resistance, CC: Abrasion resistance
Ex. = Example, SyEx. = Synthesis Example

Example 49

Synthesis of ED/4HBA/MOI=1/4/3 (1/3 mole scale)

A 1,000 ml four-necked round-bottomed flask having a stirrer, a nitrogen introducing tube, a temperature sensor and a condenser was charged with 20.1 g of ED, 192.2 g of 4HBA, 71 g of ethyl acetate and 20 g of methanol, and the mixture in the flask was refluxed with a hot water bath at 75° C. for 3 hours. Then, part of the reaction mixture was sampled and measured for $^1$H-NMR to show that a proton peak originated from an acryl group had almost disappeared. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, the temperature of the hot water bath was decreased to 60° C., 155.15 g of MOI and 367 g of ethyl acetate were added, and further, after 10 minutes, 0.8 g of tin 2-ethylhexanoate was added. The mixture was continuously stirred under heat for 3 or 4 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product. Table 3 shows physical properties of the obtained multi-branched compound, and Tables 4 and 5 show physical properties of a polymerizable composition containing the above multi-branched compound and a polymerizable unsaturated-group-containing compound.

Example 83

Synthesis of ED/PPG6A/Synthesis Example 3=1/3/3 (1/3 mole scale)

A 2,000 ml four-necked round-bottomed flask having a stirrer, a nitrogen introducing tube, a temperature sensor and a condenser was charged with 20 g of ED, 510 g of PPG6A, 207 g of ethyl acetate and 20 g of methanol, and the mixture in the flask was refluxed with a hot water bath at 75° C. for 6 hours. Then, part of the reaction mixture was sampled and measured for $^1$H-NMR to show that a proton peak originated from an acryl group had almost disappeared. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 96%). Then, while the temperature of the hot water bath was maintained at 70° C., ethyl acetate was newly added to attain an ethyl acetate activity of NV 50%, and 233 g of Synthesis Example 3 was added. Further, the reaction mixture was diluted with ethyl acetate such that the reaction system as a whole had a concentration of 50%. Further, after 10 minutes, 1.1 g of tin 2-ethylhexanoate was added. The mixture was continuously stirred under heat for 3 hours, and a termination point was confirmed on the basis of IR chart. Further, the ethyl acetate used as a reaction solvent was removed with an evaporator, to give a multi-branched compound as an end product.

Examples 50–82 and 84–105

A four-necked round-bottomed flask having a stirrer, a nitrogen introducing tube, a temperature sensor and a condenser was charged with a polyamino compound (a) shown in Table 3 and an equivalent amount of ethyl acetate, and to this mixture was added a solution of 75% by weight of an active-hydrogen-containing (meth)acrylic compound (b-1) in ethyl acetate with stirring. In any case other than a case using HEA as an active-hydrogen-containing compound (b-1), methanol in an amount equimolar to that of the amino compound (a) was added. The above mixture was refluxed with a hot water bath at 75° C. for 4 hours. Then, part of the reaction mixture was sampled and measured for $^1$H-NMR to confirm a reaction termination point on the basis of a proton peak originated from an acryl group. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (a core compound). Then, while the temperature of the hot water bath was maintained at 70° C., ethyl acetate was newly added to attain an NV 50%. An isocyanate-group-containing vinyl compound (c) in a molar amount equivalent to the molar amount of the (meth)acrylic compound was added, and further, the reaction mixture was diluted with ethyl acetate such that the reaction system as a whole had a concentration of 50%. Further, after 10 minutes, tin 2-ethylhexanoate in an amount of 0.5% by weight based on the isocyanate-group-containing vinyl compound was added. The mixture was continuously stirred under heat for at least 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product. Table 3 shows both a composition of raw materials for the synthesis of the multi-branched compound and properties of the obtained multi-branched compound.

TABLE 3

| | Composition of raw materials (a)/(b-1)/(C) (Molar ratio) | Number of functional groups | Purity (%) | Average molecular weight (Mn) | Viscosity (30° C., 10-/s) (cps) |
|---|---|---|---|---|---|
| Ex. 49 | ED/4HBA/MOI = 1/4/3 | 3 | 89 | 1,014 | 4,370 |
| Ex. 50 | ED/4HBA/MOI = 1/4/2 | 2 | 90 | 882 | 3,090 |
| Ex. 51 | ED/4HBA/MOI = 1/4/1 | 1 | 92 | 752 | 2,190 |
| Ex. 52 | ED/HEA/MOI = 1/3/3 | 3 | 95 | 843 | 4,010 |
| Ex. 53 | ED/PPG6A/MOI = 1/4/3 | 3 | 81 | 2,204 | 690 |
| Ex. 54 | ED/PEG7A/MOI = 1/4/2 | 2 | 78 | 1,853 | 550 |
| Ex. 55 | ED/SA/MOI = 1/4/2 | 2 | 86 | 1,113 | 3,230 |
| Ex. 56 | ED/B2P2/MOI = 1/(2/2)/3 | 2 | 75 | 1,450 | 1,810 |
| Ex. 57 | ED/4HBA/(MOI/TMI) = 1/4/(2/1) | 3 | 90 | 1,063 | 9,510 |
| Ex. 58 | MXDA/4HBA/MOI = 1/4/3 | 3 | 82 | 1,020 | 14,784 |
| Ex. 59 | MXDA/HBA/MOI = 1/4/2 | 2 | 85 | 915 | 10,560 |
| Ex. | MXDA/(HEA/PCL2A)/ | 2 | 86 | 1,213 | 6,012 |

TABLE 3-continued

| | Composition of raw materials (a)/(b-1)/(C) (Molar ratio) | Number of functional groups | Purity (%) | Average molecular weight (Mn) | Viscosity (30° C., 10-/s) (cps) |
|---|---|---|---|---|---|
| Ex. 60 | MOI = 1/(2/2)/2 | | | | |
| Ex. 61 | MXDA/PPG6A/ MOI = 1/4/2 | 2 | 77 | 2,068 | 3,240 |
| Ex. 62 | MXDA-EO2/4HBA/ MOI = 1/2/3 | 2 | 82 | 856 | 6,950 |
| Ex. 63 | MXDA-EO2/HEA/ MOI = 1/2/3 | 3 | 82 | 805 | 7,500 |
| Ex. 64 | MXDA-EO2/PPG6A/ MOI = 1/2/2 | 2 | 76 | 1,341 | 3,912 |
| Ex. 65 | MXDA-EO2/PCL2A/ MOI = 1/1/3 | 3 | 76 | 905 | 6,006 |
| Ex. 66 | MXDA-EO2/4HBA/ MOI = 1/2/2 | 2 | 92 | 807 | 6,720 |
| Ex. 67 | MXDA-EO2/PPG6A/ MOI = 1/1/3 | 3 | 82 | 1,127 | 4,440 |
| Ex. 68 | MXDA-O2/(4HBA/ PPG6A)/MOI = 1/(1/1)/3 | 3 | 80 | 1,025 | 5,520 |
| Ex. 69 | DETA/4HBA/MOI = 1/5/4 | 4 | 82 | 1,238 | 13,500 |
| Ex. 70 | DETA/4HBA/MOI = 1/5/2 | 2 | 88 | 1,034 | 7,260 |
| Ex. 71 | DETA/(HEA/4HBA)/ MOI = 1/(3/2)/3 | 3 | 78 | 1,000 | 11,160 |
| Ex. 72 | DETA/PPG6A/ MOI = 1/3/2 | 2 | 77 | 1,649 | 3,360 |
| Ex. 73 | IPDA/4HBA/ MOI = 1/3/3 | 3 | 84 | 945 | 10,560 |
| Ex. 74 | IPDA/(HEA/PPG6A)/ MOI = 1/(2/2)/2 | 2 | 71 | 1,309 | 5,340 |
| Ex. 75 | DETA/PCL2A/ MOI = 1/4/2 | 2 | 62 | 1,341 | 6,012 |
| Ex. 76 | ED/4HBA/SyEx. 1 = 1/4/2 | 2 | 84 | 1,092 | 4,760 |
| Ex. 77 | ED/4HBA/SyEx. 5 = 1/4/2 | 2 | 79 | 1,112 | 3,560 |
| Ex. 78 | MXDA/PPG6A/ SyEx. 2 = 1/4/2 | 2 | 82 | 1,024 | 9,770 |
| Ex. 79 | ED/(HEA/4HBA)/ SyEx. 4 = 1/(2/2)/2 | 2 | 81 | 952 | 8,650 |
| Ex. 80 | ED/4HBA/SyEx. 6 = 1/4/3 | 3 | 80 | 1,287 | 4,820 |
| Ex. 81 | ED/4HBA/SyEx. 3 = 1/4/3 | 3 | 78 | 1,319 | 8,890 |
| Ex. 82 | ED/4HBA/SyEx. 3 = 1/4/1 | 1 | 81 | 817 | 2,960 |
| Ex. 83 | ED/PPG6A/SyEx. 3 = 1/3/3 | 3 | 69 | 1,955 | 1,530 |
| Ex. 84 | ED/(4HBA/PPG6A)/ SyEx. 3 = 1/(2/2)/2 | 2 | 68 | 1,436 | 2,260 |
| Ex. 85 | ED/4HBA/SyEx. 7 = 1/4/3 | 3 | 62 | 1,811 | 2,330 |
| Ex. 86 | MXDA/4HBA/SyEx. 3 = 1/4/3 | 3 | 80 | 1,410 | 12,780 |
| Ex. 87 | MXDA/4HBA/SyEx. 3 = 1/4/1 | 1 | 81 | 879 | 4,590 |
| Ex. 88 | MXDA/(4HBA/PPG6A)/ SyEx. 2 = 1/(2/2)/2 | 2 | 76 | 1,573 | 9,120 |
| Ex. 89 | MXDA/PCL2A/SyEx. 3 = 1/3/3 | 3 | 80 | 1,815 | 5,940 |
| Ex. 90 | MXDA/(HEA/4HBA)/ SyEx. 7 = 1/(2/2)/3 | 3 | 75 | 2,168 | 7,380 |
| Ex. 91 | MXDA-EO2/4HBA/ SyEx. 3 = 1/2/3 | 3 | 78 | 1,222 | 8,100 |
| Ex 92 | MXDA-EO2/(HEA/ PPG6A)/SyEx. 3 = 1/(1/1)/3 | 3 | 68 | 1,305 | 5,274 |
| Ex. 93 | MXDA-EO2/PCL2A/ SyEx. 3 = 1/1/2 | 2 | 71 | 983 | 5,922 |
| Ex. 94 | MXDA-EO2/4HBA/ SyEx. 3 = 1/2/2 | 2 | 76 | 959 | 9,240 |
| Ex. 95 | MXDA-EO2/HEA/ SyEx. 7 = 1/2/3 | 3 | 76 | 1,167 | 14,580 |
| Ex. | MXDA-EO2/PPG6A/ SyEx. 3 = 1/1/3 | 3 | 72 | 1,422 | 7,410 |
| Ex. 97 | MXDA-EO2/PCL2A/ SyEx. 2 = 1/2/2 | 2 | 68 | 1,144 | 5,382 |
| Ex. 98 | DETA/4HBA/SyEx. 3 = 1/5/4 | 4 | 70 | 1,566 | 18,720 |
| Ex. 99 | DETA/(HEA/4HBA)/ SyEx. 3 = 1/(2/2)/3 | 3 | 80 | 1,333 | 14,628 |
| Ex. 100 | DETA/HEA/SyEx. 4 = 1/5/3 | 3 | 78 | 1,223 | 20,520 |
| Ex. 101 | DETA/PCL2A/SyEx. 3 = 1/4/3 | 3 | 69 | 1,827 | 13,860 |
| Ex. 102 | IPDA/4HBA/SyEx. 3 = 1/4/3 | 3 | 70 | 1,276 | 13,080 |
| Ex. 103 | IPDA/4HBA/SyEx. 3 = 1/4/2 | 2 | 71 | 1,052 | 11,040 |
| Ex. 104 | IPDA/PPG6A/SyEx. 4 = 1/4/3 | 3 | 65 | 2,169 | 4,590 |
| Ex. 105 | IPDA/(4HBA/PCL2A)/ SyEx. 3 = 1/(2/1)/2 | 2 | 74 | 1,132 | 4,734 |

Ex. = Example, SyEx. = Synthesis Example

Examples 106–133

Some of the multi-branched compounds obtained in Examples 49 to 105 and various polymerizable unsaturated-group-containing compounds (B) were used to prepare curable compositions. Table 4 shows contents and viscosity values of these curable compositions. Further, these curable compositions and the multi-branched compounds were applied to four kinds of film (substrate size for evaluation; thickness=20 μm, width=5 cm, length=20 cm) with a #6 bar coater, and the resultant coatings were irradiated with electron beam at various doses (5, 20 and 40 kGy). Table 4 shows contents of the used curable compositions and kinds of the multi-branched compounds, and also shows results of evaluations of curing properties (finger touch test→X= tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated on the basis of visual observation of deformation of substrate film, ○=free of curling, Δ=edges bending, X=film underwent curling) and abrasion resistance of the coatings obtained by the irradiation with electron beam. Further, compositions containing multi-branched compounds having no terminal polar group (ED/HEA/ MOI=1/4/4) and compositions containing commercially available linear urethane acrylate (Shikoh UV-1700B) were evaluated in the same manner, and Table 4 also shows the results.

TABLE 4

| | Multi-branched compound (A) | Compound | A/B Weight | Viscosity | Curability | | Adhesion to substrate | | | | AA | BB |
|---|---|---|---|---|---|---|---|---|---|---|---|---|
| | Raw materials (a)/(b-1)/c | (B) | ratio | (30° C./s) | 5 kGy | 20 kGy | PE | OPP | NY | PET | | |
| Ex. 106 | ED/4HBA/MOI = 1/4/3 | PEG9DA | 3/7 | 98 | ○ | ○ | ○ | ○ | ○ | ○ | 100 | ○ |
| Ex. 107 | ED/4HBA/MOI = 1/4/3 | NODA | 3/7 | 32 | ○ | ○ | ○ | ○ | ○ | ○ | 100 | ○ |
| Ex. 108 | ED/4HBA/MOI = 1/4/3 | TPGDA | 3/7 | 45 | ○ | ○ | ○ | ○ | ○ | ○ | 98 | ○ |
| Ex. 109 | ED/4HBA/MOI = 1/4/3 | BP4EA | 3/7 | 821 | ○ | ○ | ○ | ○ | ○ | ○ | 100 | ○ |
| Ex. 110 | ED/4HBA/MOI = 1/4/3 | TMPT3EO | 3/7 | 123 | ○ | ○ | ○ | ○ | ○ | ○ | 100 | ○ |
| Ex. 111 | ED/4HBA/MOI = 1/4/3 | DPHA | 3/7 | 3,098 | ○ | ○ | ○ | Δ | ○ | ○ | 100 | ○ |
| Ex. 112 | ED/4HBA/MOI = 1/4/3 | PEG8DA | 5/5 | 192 | ○ | ○ | ○ | ○ | ○ | ○ | 100 | ○ |
| Ex. 113 | ED/4HBA/MOI = 1/4/3 | PEG9DA | 7/3 | 373 | ○ | ○ | ○ | ○ | ○ | ○ | 100 | ○ |
| Ex. 114 | ED/HEA/MOI = 1/3/3 | PEG9DA | 3/7 | 93 | ○ | ○ | ○ | ○ | ○ | ○ | 100 | ○ |
| Ex. 115 | ED/HEA/MOI = 1/3/3 | TMPT3EO | 3/7 | 117 | ○ | ○ | ○ | ○ | Δ | ○ | 100 | ○ |
| Ex. 116 | ED/PPG6A/MOI = 1/4/3 | PEG9DA | 3/7 | 124 | ○ | ○ | ○ | Δ | ○ | ○ | 98 | ○ |
| Ex. 117 | ED/PPG6A/MOI = 1/4/3 | TMPT3EO | 3/7 | 156 | ○ | ○ | ○ | ○ | ○ | ○ | 98 | ○ |
| Ex. 118 | ED/4HBA/PPG6A/MOI = 1/(2/2)/3 | PEG9DA | 3/7 | 110 | ○ | ○ | ○ | ○ | ○ | ○ | 99 | ○ |
| Ex. 119 | ED/4HBA/PPG6A/MOI = 1/(2/2)/3 | TMPT3EO | 3/7 | 137 | ○ | ○ | ○ | ○ | ○ | ○ | 97 | ○ |
| Ex. 120 | MXDA-EO2/4HBA/MOI = 1/2/3 | PEG9DA | 3/7 | 94 | ○ | ○ | ○ | ○ | ○ | ○ | 100 | ○ |
| Ex. 121 | MXDA-EO2/4HBA/MOI = 1/2/3 | TMPT3EO | 3/7 | 117 | ○ | ○ | ○ | ○ | ○ | ○ | 99 | ○ |
| Ex. 122 | IPDA/4HBA/MOI = 1/3/3 | PEG9DA | 3/7 | 96 | ○ | ○ | ○ | ○ | ○ | ○ | 100 | ○ |
| Ex. 123 | IPDA/4HBA/MOI = 1/3/3 | TMPT3EO | 3/7 | 121 | ○ | ○ | ○ | ○ | ○ | ○ | 100 | ○ |
| Ex. 124 | ED/4HBA/SyEx. 3 = 1/4/3 | PEG9DA | 3/7 | 106 | ○ | ○ | ○ | ○ | ○ | ○ | 100 | ○ |
| Ex. 125 | ED/4HBA/SyEx. 3 = 1/4/3 | TMPT3EO | 3/7 | 133 | ○ | ○ | ○ | ○ | ○ | ○ | 100 | ○ |
| Ex. 126 | ED/PPG6A/SyEx. 3 = 1/3/3 | TPGDA | 3/7 | 120 | ○ | ○ | ○ | ○ | ○ | ○ | 98 | ○ |
| Ex. 127 | ED/PPG6A/SyEx. 3 = 1/3/3 | TMPT3EO | 3/7 | 150 | ○ | ○ | ○ | ○ | ○ | ○ | 100 | ○ |
| Ex. 128 | MXDA-EO2/4HBA/SyEx. 3 = 1/2/3 | TPGDA | 3/7 | 104 | ○ | ○ | ○ | ○ | ○ | ○ | 97 | ○ |
| Ex. 129 | MXDA-EO2/4HBA/SyEx. 3 = 1/2/3 | TMPT3EO | 3/7 | 130 | ○ | ○ | ○ | ○ | ○ | ○ | 100 | ○ |
| Ex. 130 | IPDA/4HBA/SyEx. 3 = 1/4/3 | TPGDA | 3/7 | 105 | ○ | ○ | ○ | ○ | ○ | ○ | 100 | ○ |
| Ex. 131 | IPDA/4HBA/SyEx. 3 = 1/4/3 | TMPT3EO | 3/7 | 132 | ○ | ○ | ○ | ○ | ○ | ○ | 100 | ○ |
| Ex. 132 | ED/4HBA/MOI = 1/4/3 | — | 10/0 | — | ○ | ○ | ○ | ○ | ○ | ○ | 100 | ○ |
| Ex. 133 | ED/PPG6A/MOI = 1/4/3 | — | 10/0 | — | ○ | ○ | ○ | ○ | ○ | ○ | 95 | ○ |
| CEx. 7 | DE/HEA/MOI = 1/4/4 | TPGDA | 3/7 | 191 | ○ | ○ | ○ | Δ | Δ | ○ | 100 | ○ |
| CEx. 8 | DE/HEA/MOI = 1/4/4 | TMPT3EO | 3/7 | 239 | ○ | ○ | ○ | Δ | Δ | ○ | 100 | ○ |
| CEx. 9 | Linear urethane acrylate UV-1700B | TPGDA | 3/7 | 1,247 | ○ | ○ | ○ | ○ | ○ | ○ | 99 | ○ |
| CEx. 10 | Linear urethane acrylate UV-1700B | TMPT3EO | 3/7 | 938 | ○ | ○ | ○ | ○ | ○ | ○ | 99 | ○ |

Ex. = Example, CEx. = Comparative Example
SyEx. = Synthesis Example
AA: Solvent resistance, BB: Abrasion resistance Example 134

Synthesis of ED/(HEA/EHA)/MOI (1/5 mole scale)

A 500 ml four-necked round-bottomed flask having a stirrer, a nitrogen introducing tube, a temperature sensor and a condenser was charged with 12 g of ED, 70 g of HEA, 37 g of EHA and 51 g of ethyl acetate, and the mixture in the flask was refluxed with a hot water bath at 75° C. for 3 hours. Then, part of the reaction mixture was sampled and measured for $^1$H-NMR to show that a proton peak originated from an acryl group had almost disappeared. Then, the temperature of the hot water bath was decreased to 60° C., a mixture of 93 g of MOI and 93 g of ethyl acetate was added, and after 10 minutes, 0.6 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product.

Example 135

Synthesis of ED/(HEA/EHA)/(Synthesis Example 3) (1/10 mole scale)

A 500 ml four-necked round-bottomed flask having a stirrer, a nitrogen introducing tube, a temperature sensor and a condenser was charged with 6 g of ED, 35 g of HEA, 18 g of EHA and 25 g of ethyl acetate, and the mixture in the flask was refluxed with a hot water bath at 75° C. for 3 hours. Then, part of the reaction mixture was sampled and measured for $^1$H-NMR to show that a proton peak originated from an acryl group had almost disappeared. Then, the temperature of the hot water bath was decreased 60° C., a mixture of 101 g of (Synthesis Example 3) and 101 g of ethyl acetate was added, and after 10 minutes, 0.3 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product.

Examples 136–163

A four-necked round-bottomed flask having a stirrer, a nitrogen introducing tube, a temperature sensor and a condenser was charged with a polyamino compound (a) shown in Table 5 and an equivalent amount of ethyl acetate, and to this mixture was added a solution of 70% by weight of an active-hydrogen-containing (meth)acrylic compound (b-1) and a non-functional (meth)acrylic compound (b-2) in ethyl acetate with stirring. In any case other than a case using HEA as an active-hydrogen-containing compound (b-1), methanol in an amount equimolar to that of the polyamino compound (a) was added. The above mixture was refluxed with a hot water bath at 75° C. for 4 hours. Then, part of the reaction mixture was sampled and measured for $^1$H-NMR to confirm a reaction termination point on the basis of a proton peak originated from an acryl group. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin. Then, while the temperature of the hot water bath was maintained at 70° C., ethyl acetate was newly added to attain an NV 50%. An isocyanate-group-containing vinyl compound (c) in a molar amount equivalent to the molar amount of the total of the (meth)acrylic compound (b-1) and the non-functional (meth)acrylic compound (b-2) was added, and further, the reaction mixture was diluted with ethyl acetate such that the reaction system as a whole had a concentration of 50%. Further, after 10 minutes, tin 2-ethylhexanoate in an amount of 0.5% by weight based on the isocyanate-group-containing vinyl compound (c) was added. The mixture was continuously stirred under heat for at least 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product. Table 5 shows both a composition of raw materials for the synthesis of the multi-branched compound and properties of the obtained multi-branched compound. Further, for comparison, Comparative Example 16 (linear urethane acrylate) were evaluated in the same manner, and Table 5 also shows the results.

TABLE 5

| | Composition of raw materials (a)/(b-1)/b-2)/(c) (Molar ratio) | Number of functional groups | Purity (%) | Average molecular weight (Mn) | Viscosity (30° C., cps) |
|---|---|---|---|---|---|
| Ex. 134 | ED/(HEA/EHA)/MOI = 1/(3/1)/3 | 3 | 94 | 1,015 | 4,025 |
| Ex. 135 | ED/(HEA/EHA)/SyEx. 3 = 1(3/1)/3 | 3 | 90 | 1,498 | 9,450 |
| Ex. 136 | ED/(PPG6A/EHA)/ MOI = 1(3/1)/3 | 3 | 88 | 2,012 | 1,810 |
| Ex. 137 | ED/(PPG6A/EHA)/SyEx. 3 = 1(3/1)/3 | 3 | 87 | 2,494 | 2,220 |
| Ex. 138 | ED/(HEA/MPEG9A)/ MOI = 1(3/1)/3 | 3 | 82 | 1,227 | 4,210 |
| Ex. 139 | ED/(HEA/MPEG9A)/ SyEx. 3 = 1(3/1)/3 | 3 | 81 | 1,699 | 5,420 |
| Ex. 140 | ED/(PPG6A/MPEG9A)/ MOI = 1(3/1)/3 | 3 | 77 | 2,101 | 1,730 |
| Ex. 141 | ED/(PPG6A/MPEG9A/ SyEx. 3 = 1(3/1)/3 | 3 | 75 | 2,520 | 1,940 |
| Ex. 142 | MXDA/(HEA/EHA)/ MOI = 1(3/1)/3 | 3 | 91 | 1,063 | 12,300 |

TABLE 5-continued

| | Composition of raw materials (a)/(b-1)/b-2)/(c) (Molar ratio) | Number of functional groups | Purity (%) | Average molecular weight (Mn) | Viscosity (30° C., cps) |
|---|---|---|---|---|---|
| Ex. 143 | MXDA/(HEA/EHA)/ SyEx. 6 = 1(3/1)/3 | 3 | 88 | 1,472 | 9,870 |
| Ex. 144 | MXDA/(PPG6A/EHA)/ MOI = 1(3/1)/3 | 3 | 85 | 2,019 | 3,930 |
| Ex. 145 | MXDA/(PPG6A/EHA)/ SyEx. 7 = 1(3/1)/3 | 3 | 81 | 3,452 | 8,230 |
| Ex. 146 | MXDA/(HEA/ MPEG9A)/MOI = 1(3/1)/3 | 3 | 81 | 1,282 | 8,140 |
| Ex. 147 | MXDA/(HEA/ MPEG9A)/SyEx. 6 = 1(3/1)/3 | 3 | 79 | 1,670 | 8,230 |
| Ex. 148 | MXDA/(PPG6A/ MPEG9A)/MOI = 1(3/1)/3 | 3 | 77 | 2,160 | 2,930 |
| Ex. 149 | MXDA/(PPG6A/ MPEG9A)/SyEx. 7 = 1(3/1)/3 | 3 | 74 | 3,531 | 4,870 |
| Ex. 150 | ED/(HEA/EHA)/ MOI = 1/(3/1)/2 | 2 | 94 | 869 | 3,950 |
| Ex. 151 | ED/(PPG6A/EHA)/SyEx. 3 = 1(3/1)/2 | 2 | 91 | 2,277 | 1,730 |
| Ex. 152 | ED/(HEA/MPEG9A)/ SyEx. 3 = 1(3/1)/2 | 2 | 84 | 1,448 | 5,660 |
| Ex. 153 | ED/(PPG6A/MEPG9A)/ MOI = 1(3/1)/2 | 2 | 79 | 2,016 | 2,040 |
| Ex. 154 | MXDA/(HEA/EHA)/ SyEx. 6 = 1(3/1)/2 | 2 | 90 | 1,213 | 8,230 |
| Ex. 155 | MXDA/(PPG6A/EHA)/ MOI = 1(3/1)/2 | 2 | 86 | 1,906 | 3,250 |
| Ex. 156 | MXDA/(HEA/ MPEG9A)/MOI = 1(3/1)/2 | 2 | 78 | 1,137 | 7,820 |
| Ex. 157 | MXDA/(PPG6A/ MEPG9A/SyEx. 7 = 1(3/1)/2 | 2 | 83 | 3,205 | 4,210 |
| Ex. 158 | ED/(HEA/EHA)/SyEx. 3 = 1(2/2)/2 | 2 | 83 | 1,198 | 5,240 |
| Ex. 159 | ED/(PPG6A/MPEG9A)/ MOI = 1(2/2)/2 | 2 | 78 | 1,978 | 1,650 |
| Ex. 160 | MXDA(PPG6A/EHA)/ SyEx. 7 = 1(2/2)2 | 2 | 83 | 2,636 | 6,210 |
| Ex. 161 | MXDA(HEA/MPEG9A)/ MOI = 1(2/2)2 | 2 | 78 | 1,423 | 6,540 |
| Ex. 162 | ED/(PPG6A/EHA)/ MOI = 1(1/3)/1 | 1 | 90 | 1,184 | 6,230 |
| Ex. 163 | ED/(HEA/MPEG9A)/ SyEx. 7 = 1(2/2)/1 | 1 | 79 | 1,433 | 3,410 |
| CEx. 11 | Linear urethane acrylate | — | — | 2,000 | 22,500 |

Ex. = Example, SyEx. = Synthesis Example
CEx. = Comparative Example

Examples 164–197

The multi-branched compounds (A) obtained in Examples 134 to 163 or compositions containing the multi-branched compounds (A) and polymerizable unsaturated-group-containing compounds (B) were applied to four kinds of film (substrate size for evaluation; thickness=20 μm, width=5 cm, length=20 cm) with a #6 bar coater, and the resultant coatings were irradiated with electron beam at various doses (5, 20 and 40 kGy). Table 6 shows contents of the used multi-branched compounds and results of evaluations of curing properties (finger touch test→X=tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated on the basis of visual observation of deformation of substrate film, ○=free of curling, Δ=edges bending, X=film underwent curling) and abrasion resistance of the coatings obtained by the irradiation with electron beam. For reference, Table 6 also shows evaluation results of Comparative Example 15/BP4EA and Comparative Example 16/BP4EA.

Examples 198–213

A four-necked round-bottomed flask having a stirrer, a nitrogen introducing tube, a temperature sensor and a condenser was charged with a polyamino compound (a) shown in Table 7 and an equivalent amount of ethyl acetate, and to this mixture was added a solution of 50% by weight of an active-hydrogen-containing (meth)acrylic compound (b-1) and a non-functional (meth)acrylic compound (b-2) in ethyl acetate with stirring. In any case other than a case using HEA

TABLE 6

| | A/B Molar ratio | Viscosity (30° C., cps) | Curability Dose (kGy) 5 | Curability Dose (kGy) 20 | Adhesion to substrate Dose (20 kGy) PE | Adhesion to substrate Dose (20 kGy) OPP | Adhesion to substrate Dose (20 kGy) NY | Adhesion to substrate Dose (20 kGy) PET | AA (%) Substrate: PET, Dose: 20 kGY | BB | CC |
|---|---|---|---|---|---|---|---|---|---|---|---|
| Ex. 164 | Ex. 134 | 4,025 | ○ | ○ | ○ | ○ | ○ | ○ | 95 | ○ | ○ |
| Ex. 165 | Ex. 134/BP4EA = 1/9 | 112 | ○ | ○ | ○ | Δ | Δ | ○ | 93 | Δ | Δ |
| Ex. 166 | Ex. 134/NODA = 2/8 | 26 | ○ | ○ | ○ | ○ | ○ | ○ | 94 | ○ | ○ |
| Ex. 167 | Ex. 134/TPGDA = 2/8 | 38 | ○ | ○ | ○ | ○ | ○ | ○ | 95 | ○ | ○ |
| Ex. 168 | Ex. 134/BP4EA = 2/8 | 166 | ○ | ○ | ○ | ○ | ○ | ○ | 97 | ○ | ○ |
| Ex. 169 | Ex. 134/TMPT3EO = 2/8 | 120 | ○ | ○ | ○ | ○ | ○ | ○ | 100 | ○ | ○ |
| Ex. 170 | Ex. 134/DPHA = 2/8 | 759 | ○ | ○ | ○ | ○ | ○ | ○ | 100 | ○ | ○ |
| Ex. 171 | Ex. 134/NODA = 3/7 | 49 | ○ | ○ | ○ | ○ | ○ | ○ | 93 | ○ | Δ |
| Ex. 172 | Ex. 134/TPGDA = 3/7 | 69 | ○ | ○ | ○ | ○ | Δ | ○ | 95 | ○ | ○ |
| Ex. 173 | Ex. 134/BP4EA = 3/7 | 248 | ○ | ○ | ○ | ○ | ○ | ○ | 92 | ○ | Δ |
| Ex. 174 | Ex. 134/TMPT3EO = 3/7 | 187 | Δ | Δ | ○ | Δ | Δ | Δ | 97 | ○ | Δ |
| Ex. 175 | Ex. 134/DPHA = 3/7 | 935 | ○ | ○ | ○ | ○ | ○ | ○ | 100 | ○ | ○ |
| Ex. 176 | Ex. 134/BP4EA = 4/6 | 369 | ○ | ○ | ○ | ○ | ○ | ○ | 92 | ○ | Δ |
| Ex. 177 | Ex. 143 | 9,870 | ○ | ○ | ○ | ○ | ○ | ○ | 97 | ○ | ○ |
| Ex. 178 | Ex. 143/TPGDA = 1/9 | 23 | ○ | ○ | ○ | Δ | Δ | Δ | 92 | Δ | Δ |
| Ex. 179 | Ex. 143/TPGDA = 2/8 | 46 | ○ | ○ | ○ | Δ | Δ | ○ | 94 | ○ | ○ |
| Ex. 180 | Ex. 143/NODA = 3/7 | 63 | ○ | ○ | ○ | ○ | Δ | ○ | 95 | ○ | ○ |
| Ex. 181 | Ex. 143/TPGDA = 3/7 | 90 | ○ | ○ | ○ | ○ | Δ | ○ | 96 | ○ | Δ |
| Ex. 182 | Ex. 143/BP4EA = 3/7 | 324 | ○ | ○ | ○ | ○ | ○ | ○ | 94 | ○ | ○ |
| Ex. 183 | Ex. 143/TMPT3EO = 3/7 | 244 | Δ | ○ | ○ | ○ | ○ | ○ | 98 | ○ | ○ |
| Ex. 184 | Ex. 143/DPHA = 3/7 | 1,223 | ○ | ○ | ○ | ○ | ○ | ○ | 100 | ○ | ○ |
| Ex. 185 | Ex. 143/TPGDA = 4/6 | 176 | ○ | ○ | ○ | ○ | ○ | ○ | 95 | ○ | ○ |
| Ex. 186 | Ex. 151/BP4EA = 2/8 | 140 | ○ | ○ | ○ | ○ | ○ | ○ | 90 | ○ | ○ |
| Ex. 187 | Ex. 151/BP4EA = 2/8 | 192 | ○ | ○ | ○ | ○ | ○ | ○ | 91 | ○ | ○ |
| Ex. 188 | Ex. 151/TPGDA = 3/7 | 53 | ○ | ○ | ○ | ○ | Δ | ○ | 92 | ○ | ○ |
| Ex. 189 | Ex. 160/BP4EA = 2/8 | 181 | Δ | ○ | ○ | Δ | ○ | ○ | 93 | ○ | Δ |
| Ex. 190 | Ex. 160/BP4EA = 3/7 | 282 | ○ | ○ | ○ | ○ | ○ | ○ | 92 | ○ | ○ |
| Ex. 191 | Ex. 160/TPGDA = 3/7 | 78 | Δ | Δ | ○ | Δ | Δ | Δ | 95 | ○ | Δ |
| Ex. 192 | Ex. 163/BP4EA = 2/8 | 161 | ○ | ○ | ○ | ○ | ○ | ○ | 91 | ○ | ○ |
| Ex. 193 | Ex. 163/BP4EA = 3/7 | 236 | ○ | ○ | ○ | ○ | ○ | ○ | 92 | ○ | ○ |
| Ex. 194 | Ex. 163/TPGDA = 3/7 | 65 | Δ | ○ | ○ | ○ | Δ | ○ | 94 | ○ | Δ |
| Ex. 195 | CEx. 15/BP4EA = 3/7 | 318 | ○ | ○ | Δ | Δ | Δ | Δ | 95 | ○ | ○ |
| Ex. 196 | CEx. 16/BP4EA = 3/7 | 415 | ○ | ○ | ○ | Δ | ○ | ○ | 97 | ○ | ○ |

Ex. = Example, CEx. = Comparative Example, AA = Solvent resistance, BB = Curl resistance, CC = Abrasion resistance Example 197

Synthesis of ED/4-HBA/LA/MOI (1/10 mole scale)

A 500 ml four-necked round-bottomed flask having a stirrer, a nitrogen introducing tube, a temperature sensor and a condenser was charged with 6.0 of ED, 34.8 g of 4HBA, 24.0 g of LA and 64.8 g of ethyl acetate, and the mixture in the flask was refluxed with a hot water bath at 75° C. for 3 hours. Then, part of the reaction mixture was sampled and measured for $^1$H-NMR to show that a proton peak originated from an acryl group had almost disappeared. Then, the temperature of the hot water bath was decreased to 60° C., a mixture of 46.5 g of MOI and 46.5 g of ethyl acetate was added, and after 10 minutes, 0.24 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product.

as an active-hydrogen-containing compound, methanol in an amount equimolar to that of the polyamino compound (a) was added. The above mixture was refluxed with a hot water bath at 75° C. for 4 hours. Then, part of the reaction mixture was sampled and measured for $^1$H-NMR to confirm a reaction termination point on the basis of a proton peak originated from an acryl group. Then, a fractionating column was set between the reactor and the condenser, and while the reaction mixture was continuously heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (core compound). Then, while the temperature of the hot water bath was maintained at 70° C., ethyl acetate was newly added to-attain an NV 50%. An isocyanate-group-containing vinyl compound (c) in a molar amount equivalent to the molar amount of the total of the active-hydrogen-containing (meth)acrylic compound (b-1)

and the non-functional (meth)acrylic compound (b-2) was added, and further, the reaction mixture was diluted with ethyl acetate such that the reaction system as a whole had a concentration of 50%. Further, after 10 minutes, tin 2-ethylhexanoate in an amount of 0.5% by weight based on the isocyanate-group-containing vinyl compound (c) was added. The mixture was continuously stirred under heat for at least 3 hours, and a point of time when the NCO group characteristic absorption (2,270 cm$^{-1}$) in an IR chart disappeared was taken as a termination point of the reaction. Further, the ethyl acetate used as a reaction solvent was removed with an evaporator, to give a multi-branched compound as an end product. Table 7 shows both a composition of raw materials for the synthesis of the multi-branched compound and properties of the obtained multi-branched compound. Further, for comparison, Comparative Example 17 (linear urethane acrylate UV-1700B) was evaluated in the same manner, and Table 7 also shows the results.

TABLE 7

| | Composition of raw materials (a)/(b-1)/b-2)/(c) (Molar ratio) | Number of functional groups | Purity (%) | Average molecular weight (Mn) | Viscosity (30° C., cps) |
|---|---|---|---|---|---|
| Ex. 197 | ED/(4HBA/LA)/ MOI = 1/(3/1)/3 | 3 | 93 | 1,135 | 3,052 |
| Ex. 198 | ED/(HEA/EHA)/ MOI = 1/(2/1)/3 | 3 | 90 | 875 | 2,807 |
| Ex. 199 | ED/(PPG6A/BA)/ MOI = 1/(3/1)/3 | 3 | 89 | 2,017 | 483 |
| Ex. 200 | ED/(SA/LA)/MOI = 1/(3/1)/3 | 2 | 78 | 1,063 | 2,261 |
| Ex. 201 | MXDA/(4HBA/LA)/ MOI = 1/(3/1)/3 | 2 | 80 | 955 | 7,392 |
| Ex. 202 | MXDA-EO2/(4HBA/ EHA/MOI = 1/(1/1)/3 | 3 | 86 | 918 | 4,865 |
| Ex. 203 | MXDA-PO2/(PPG6A/ EHA)/MOI = 1/(1/1)/3 | 3 | 70 | 1,188 | 3,996 |
| Ex. 204 | DETA/(4HBA/LA)/ MOI = 1/(3/2)/2 | 2 | 75 | 1,070 | 5,082 |
| Ex. 205 | IPDA/(4HBA/LA)/ MOI = 1/(2/1)/3 | 3 | 95 | 1,121 | 7,392 |
| Ex. 206 | ED/(4HBA/LA)/SyEx. 1 = 1/(3/1)/2 | 2 | 66 | 952 | 3,332 |
| Ex. 207 | ED/(4HBA/LA)/SyEx. 2 = 1/(3/1)/2 | 2 | 78 | 1,056 | 6,839 |
| Ex. 208 | ED/(4HBA/EHA)/SyEx. 3 = 1/(3/1)/3 | 3 | 68 | 1,196 | 6,223 |
| Ex. 209 | ED/(PPG6A/LA)/SyEx. 3 = 1/(3/1)/2 | 2 | 86 | 1,788 | 918 |
| Ex. 210 | MXDA/(4HBA/LA)/ SyEx. 3 = 1/(3/1)/3 | 3 | 70 | 1,319 | 8,946 |
| Ex. 211 | MXDA-EO2/(4HBA/ LA)/SyEx. 3 = 1/(1/1)/3 | 3 | 65 | 1,105 | 5,670 |
| Ex. 212 | MXDA-PO2/(4HBA/ LA)/SyEx. 3 = 1/(1/1)/2 | 2 | 70 | 962 | 6,468 |
| Ex. 213 | IPDA/(PPG6A/EHA)/ SyEx. 4 = 1/(3/1)/3 | 3 | 92 | 2,558 | 3,213 |
| CEx. 12 | Linear Urethane acrylate | 2 | — | 2,000 | 22,500 |

Examples 214–236

The multi-branched compounds (A) obtained in Examples 197 to 213 and various polymerizable unsaturated-group-containing compounds (B) were mixed in arbitrary mixing ratios to prepare curable compositions in Examples 214 to 237. Table 8 shows contents and viscosity values of the compositions. As Comparative Example, Table 8 also shows the results of a curable composition containing commercially available linear urethane acrylate Ultraviolet UV-1700B (Comparative Example 12).

These curable compositions were applied to PE films (substrate size for evaluation; thickness=20 μm, width=5 cm, length=20 cm) with a #6 bar coater, and the resultant coatings were irradiated with electron beam at a dose of 20 kGy. Table 8 shows the used curable compositions and results of evaluations of curing properties (finger touch test→X=tacking, Δ=no tacking but scratched with a finger nail, ○=no tacking and free of scratching with a finger nail) and properties of adhesion to substrate (ratio of non-peeling in Cellophane tape peeling test). For reference, Table 8 also shows the evaluation results of Comparative Example 13 (curable composition containing commercially available linear urethane acrylate Ultraviolet UV-1700B).

Examples 237–258

Further, the curable compositions (A)+(B) obtained in Examples 214 to 236 and various organic solvents were mixed in arbitrary mixing ratios, to prepare curable compositions in Examples 237 to 258. Table 9 shows the contents and viscosity values of the curable compositions. For reference, Table 9 also shows the evaluation results of Comparative Examples 14 and 15 (curable compositions containing commercially available linear urethane acrylate Ultraviolet UV-1700B).

Further, the above curable compositions were applied to PE films (substrate size for evaluation; thickness=20 μm, width=5 cm, length=20 cm) with a #6 bar coater, and the resultant coatings were irradiated with electron beam at a dose of 20 kGy. Table 9 shows the used curable compositions and results of evaluations of curing properties (finger touch test→X=tacking, Δ=no tacking but scratched with a finger nail, ○=no tacking and free of scratching with a finger nail) and properties of adhesion to substrate (ratio of non-peeling in Cellophane tape peeling test). For reference, Table 9 also shows the evaluation results of Comparative Example 14 and 15 (curable compositions containing commercially available linear urethane acrylate Ultraviolet UV-1700B).

TABLE 8

| | Multi-branched compound (A) | Compound (B) | A/B weight ratio A | A/B weight ratio B | Viscosity of Composition, cps, 30° C. | Curability Dose: 20 kGy | Adhesion |
|---|---|---|---|---|---|---|---|
| Ex. 214 | Ex. 197 | TPGDA | 3 | 7 | 63.2 | ○ | 91 |
| Ex. 215 | Ex. 198 | TPGDA | 3 | 7 | 61.6 | ○ | 99 |
| Ex. 216 | Ex. 199 | TPGDA | 3 | 7 | 36.4 | ○ | 96 |
| Ex. 217 | Ex. 200 | TPGDA | 3 | 7 | 57.8 | ○ | 98 |
| Ex. 218 | Ex. 201 | TPGDA | 3 | 7 | 82.4 | ○ | 94 |
| Ex. 219 | Ex. 202 | TPGDA | 3 | 7 | 72.7 | ○ | 91 |
| Ex. 220 | Ex. 203 | TPGDA | 3 | 7 | 68.5 | ○ | 91 |
| Ex. 221 | Ex. 204 | TPGDA | 3 | 7 | 73.7 | ○ | 95 |
| Ex. 222 | Ex. 205 | TPGDA | 3 | 7 | 82.4 | ○ | 97 |
| Ex. 223 | Ex. 206 | TPGDA | 3 | 7 | 64.9 | ○ | 92 |
| Ex. 224 | Ex. 207 | TPGDA | 3 | 7 | 80.5 | ○ | 98 |
| Ex. 225 | Ex. 208 | TPGDA | 3 | 7 | 78.3 | ○ | 92 |
| Ex. 226 | Ex. 209 | TPGDA | 3 | 7 | 44.1 | ○ | 98 |
| Ex. 227 | Ex. 210 | TPGDA | 3 | 7 | 87.3 | ○ | 90 |
| Ex. 228 | Ex. 211 | TPGDA | 3 | 7 | 76.1 | ○ | 94 |
| Ex. 229 | Ex. 212 | TPGDA | 3 | 7 | 79.2 | ○ | 95 |
| Ex. 230 | Ex. 213 | TPGDA | 3 | 7 | 64.2 | ○ | 90 |
| Ex. 231 | Ex. 197 | TPGDA | 2 | 8 | 36.3 | ○ | 90 |
| Ex. 232 | Ex. 197 | TPGDA | 4 | 6 | 110.0 | ○ | 95 |
| Ex. 233 | Ex. 197 | PEG9DA | 3 | 7 | 136.9 | ○ | 95 |
| Ex. 234 | Ex. 197 | NODA | 3 | 7 | 44.6 | ○ | 89 |
| Ex. 235 | Ex. 197 | TPGDA | 3 | 7 | 63.2 | ○ | 92 |
| Ex. 236 | Ex. 197 | TMPT3EO | 3 | 7 | 171.7 | ○ | 90 |

TABLE 8-continued

| Multi-branched compound (A) | Compound (B) | A/B weight ratio A | A/B weight ratio B | Viscosity of Composition, cps, 30° C. | Curability Dose: 20 kGy | Adhesion |
|---|---|---|---|---|---|---|
| CEx. 13 UV-1700B | TPGDA | 3 | 7 | 575.5 | ○ | 65 |

Ex. = Example, CEx. = Comparative Example

TABLE 9

| Curable composition (A) + (B) | Organic solvent (C) | (A + B)/C Weight ratio A + B | (A + B)/C Weight ratio C | Viscosity of solvent-containing composition (cps, 30° C.) | Curability Dose: 20 kGy | Adhesion |
|---|---|---|---|---|---|---|
| Ex. 237 | Ex. 214 | MEK | 7 | 3 | 14.1 | ○ | 92 |
| Ex. 238 | Ex. 215 | MEK | 7 | 3 | 13.8 | ○ | 91 |
| Ex. 239 | Ex. 216 | MEK | 7 | 3 | 9.6 | ○ | 96 |
| Ex. 240 | Ex. 217 | MEK | 7 | 3 | 13.2 | ○ | 95 |
| Ex. 241 | Ex. 218 | MEK | 7 | 3 | 16.9 | ○ | 90 |
| Ex. 242 | Ex. 219 | MEK | 7 | 3 | 15.5 | ○ | 93 |
| Ex. 243 | Ex. 220 | MEK | 7 | 3 | 14.9 | ○ | 91 |
| Ex. 244 | Ex. 221 | MEK | 7 | 3 | 15.7 | ○ | 94 |
| Ex. 245 | Ex. 222 | MEK | 7 | 3 | 16.9 | ○ | 92 |
| Ex. 246 | Ex. 223 | MEK | 7 | 3 | 14.3 | ○ | 92 |
| Ex. 247 | Ex. 224 | MEK | 7 | 3 | 16.7 | ○ | 96 |
| Ex. 248 | Ex. 225 | MEK | 7 | 3 | 16.3 | ○ | 92 |
| Ex. 249 | Ex. 226 | MEK | 7 | 3 | 10.9 | ○ | 97 |
| Ex. 250 | Ex. 227 | MEK | 7 | 3 | 17.6 | ○ | 91 |
| Ex. 251 | Ex. 228 | MEK | 7 | 3 | 16.0 | ○ | 95 |
| Ex. 252 | Ex. 229 | MEK | 7 | 3 | 16.5 | ○ | 90 |
| Ex. 253 | Ex. 230 | MEK | 7 | 3 | 14.2 | ○ | 89 |
| Ex. 254 | Ex. 214 | MEK | 8 | 2 | 23.2 | ○ | 90 |
| Ex. 255 | Ex. 214 | MEK | 6 | 4 | 8.5 | ○ | 92 |
| Ex. 256 | Ex. 214 | toluene | 7 | 3 | 15.5 | ○ | 93 |
| Ex. 257 | Ex. 214 | n-butanol | 7 | 3 | 25.2 | ○ | 89 |
| Ex. 258 | Ex. 197 | ethyl acetate | 7 | 3 | 14.3 | ○ | 92 |
| CEx. 14 | UV-1700B | MEK | 7 | 3 | 132.1 | ○ | 70 |
| CEx. 15 | UV-1700B | n-butanol | 7 | 3 | 236.6 | ○ | 68 |

What is claimed is:

1. A multi-branched compound which is obtained by reacting a core compound obtained by subjecting (a) a polyamino compound having at least one primary or secondary amino group and (b-1) an active-hydrogen-containing (meth)acrylic compound to a Michael addition reaction with (c) a vinyl-group-containing compound having a functional group reactive with the active hydrogen.

2. The multi-branched compound according to claim 1, which is obtained by reacting active hydrogen of the core compound with the vinyl-group-containing compound (c) having a functional group reactive with active hydrogen, the amount of the functional group being stoichiometrically equivalent to the amount of the active hydrogen.

3. The multi-branched compound according to claim 1, which is obtained by reacting active hydrogen of the core compound with the vinyl-group-containing compound (c) having a functional group reactive with active hydrogen, part of the active hydrogen atoms remaining unreacted.

4. The multi-branched compound according to claim 3, which is obtained by reacting the vinyl-group-containing compound (c) having a functional group reactive with active hydrogen to at least one of all the active hydrogen atoms of the core compound and reacting the vinyl-group-containing compound (c) having a functional group reactive with active hydrogen to 95% or less of all the active hydrogen atoms of the core compound.

5. The multi-branched compound according to claim 1, wherein the polyamino compound (a) is a diamino compound of the following formula (1),

$$H_2N\text{---}CH_2\text{---}R\text{---}CH_2\text{---}NH_2 \quad (1)$$

wherein R is a direct bond, $-C_nH_{2n}-$ in which n is an integer of 1 to 20, a phenylene group or a cycloalkylene group.

6. The multi-branched compound according to claim 1, wherein the polyamino compound (a) has a number average molecular weight of 30 to 5,000.

7. The multi-branched compound according to claim 1, wherein the vinyl-group-containing compound (c) having a functional group reactive with active hydrogen is a vinyl-group-containing compound containing an isocyanate group.

8. The multi-branched compound according to claim 1, wherein the active-hydrogen-containing (meth)acrylic compound (b-1) is at least one member selected from compounds of the following formulae (2) to (5),

$$CH_2\text{=}C(R^1)COO\text{---}R^2\text{---}OH \quad (2)$$

wherein $R^1$ is a hydrogen atom or $-CH_3$ and $R^2$ is an alkylene group having 2 to 22 carbon atoms,

$$CH_2\text{=}C(R^1)COO(C_xH_{2x}O)_mH \quad (3)$$

wherein $R^1$ is a hydrogen atom or $-CH_3$, x is an integer of 1 to 6 and m is an integer of 1 to 25,

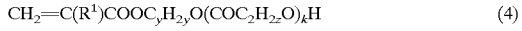

$$CH_2\text{=}C(R^1)COOC_yH_{2y}O(COC_2H_{2z}O)_kH \quad (4)$$

wherein $R^1$ is a hydrogen atom or $-CH_3$, y is an integer of 2 to 22, z is an integer of 2 to 15 and k is an integer of 1 to 20,

$$CH_2\text{=}C(R^1)COR^3O(CONHR^4NHOR^5O)_hH \quad (5)$$

wherein $R^1$ is a hydrogen atom or $-CH_3$, $R^3$ is an alkylene group having 2 to 22 carbon atoms, $R^4$ is an isocyanate residue of any one of the following formulae (6-a) to (6-h), $R^5$ is a dihydric alcohol residue of $-(C_rH_{2r}O)_q-$ in which r is an integer of 1 to 4 and q is an integer of 1 to 20 or $-C_pH_{2p}-$ in which p is an integer of 1 to 20 and h is an integer of 1 to 10.

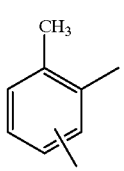

(6-a)

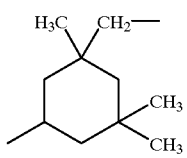

(6-b)

43

-continued

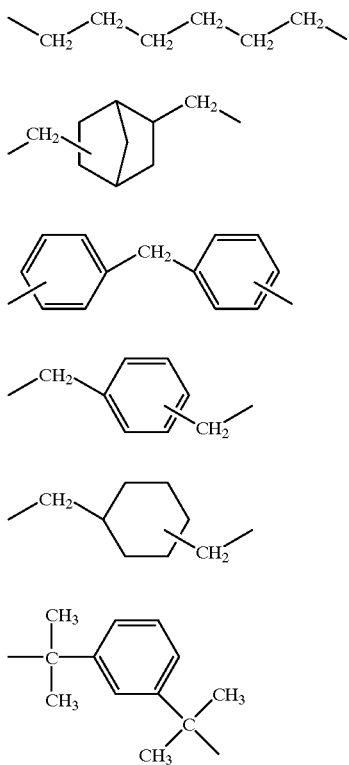

(6-c)
(6-d)
(6-e)
(6-f)
(6-g)
(6-h)

9. The multi-branched compound according to claim 1, wherein the core compound is obtained by reacting the polyamino compound (a) with the active-hydrogen-containing (meth)acrylic compound (b-1) and a non-functional (meth)acrylic compound (b-2) of the following formula (8) to a Michael addition reaction, $$CH_2=C(R^1)COO-R^6 \qquad (8)$$

wherein $R^1$ is a hydrogen atom or methyl and $R^6$ is $-C_vH_{2v+1}$, $-(C_{x2x}O)_mR^7$ or $-C_yH_{2y}O(COC_zH_{2z}O)_kR^7$ in which $R^7$ is a phenyl group or an alkyl group having 1 to 22 carbon atoms, v is an integer of 1 to 25, x is an integer of 1 to 6, y is an integer of 2 to 22, z is an integer of 2 to 15, m is an integer of 1 to 25 and k is an integer of 1 to 20.

44

10. The multi-branched compound according to claim 9, wherein the active-hydrogen-containing (meth)acrylic compound (b-1) and the non-functional (meth)acrylic compound (b-2) have a (b-1):(b-2) molar ratio of is 1:99 to 99:1.

11. The multi-branched compound according to claim 1, which has the formula (9),

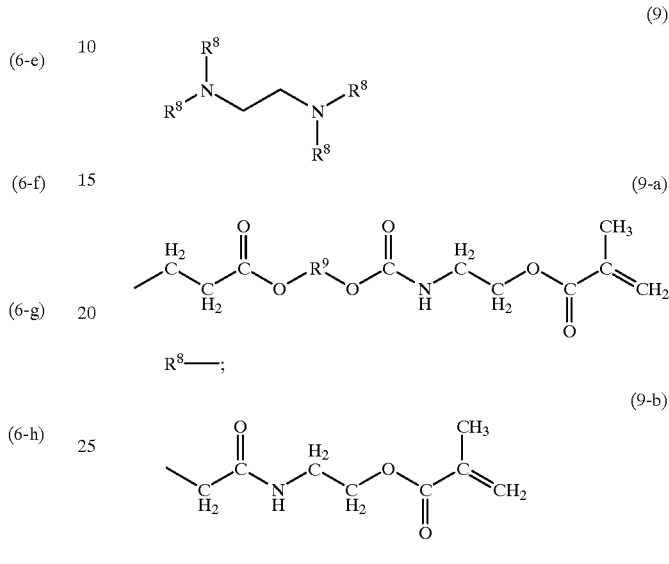

(9)
(9-a)
(9-b)

Wherein $R^8$ is an organic residue shown by formula (9-a) or (9-b), $R^9$ is an alkylene group having 2 to 22 carbon atoms or polyalkyleneglycol residue shown by $-(C_sH_{2s}O)_t-$ in which s is an integer of 2 to 4, t is an integer of 1 to 25.

12. The multi-branched compound according to claim 1, wherein the compound is is in a liquid state at 30° C. and has a number average molecular weight of 200 to 10,000 and a viscosity, measured at 30° C., of 100,000 cps or lower.

13. The multi-branched compound according to claim 1, which is radiation-curable.

14. The cured product obtained by curing the multi-branched compound recited in claim 1.

* * * * *